US009512238B2

(12) United States Patent
Iji et al.

(10) Patent No.: US 9,512,238 B2
(45) Date of Patent: Dec. 6, 2016

(54) CELLULOSE RESIN AND METHOD FOR PRODUCING THE SAME

(71) Applicants: Masatoshi Iji, Tokyo (JP); Sungil Moon, Tokyo (JP); Shukichi Tanaka, Tokyo (JP); Hiroyuki Kai, Tokyo (JP)

(72) Inventors: Masatoshi Iji, Tokyo (JP); Sungil Moon, Tokyo (JP); Shukichi Tanaka, Tokyo (JP); Hiroyuki Kai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 57 days.

(21) Appl. No.: 14/541,943

(22) Filed: Nov. 14, 2014

(65) Prior Publication Data

US 2015/0073135 A1    Mar. 12, 2015

Related U.S. Application Data

(62) Division of application No. 13/500,247, filed as application No. PCT/JP2010/067333 on Oct. 4, 2010, now Pat. No. 8,916,699.

(30) Foreign Application Priority Data

Oct. 5, 2009   (JP) ................. 2009-231670
Apr. 30, 2010  (JP) ................. 2010-105509
Jul. 8, 2010   (JP) ................. 2010-156238

(51) Int. Cl.
| C08B 3/22  | (2006.01) |
| C08B 13/00 | (2006.01) |
| C08B 3/10  | (2006.01) |
| C08B 3/16  | (2006.01) |

(52) U.S. Cl.
CPC . C08B 3/22 (2013.01); C08B 3/10 (2013.01); C08B 3/16 (2013.01); C08B 13/00 (2013.01)

(58) Field of Classification Search
CPC ............. C08B 3/10; C08B 3/16; C08B 3/22; C08B 13/00
See application file for complete search history.

(56) References Cited

U.S. PATENT DOCUMENTS

| 2,181,119 A | 11/1939 | Caplan |
| 2,191,306 A | 2/1940  | Borglin |
| 2,191,307 A | 2/1940  | Borglin |
| 2,224,238 A | 12/1940 | Spitzli et al. |
| 2,284,369 A | 5/1942  | Solomon |
| 2,290,861 A | 7/1942  | Campbell |
| 2,551,282 A | 5/1951  | Palmer et al. |
| 2,786,829 A | 3/1957  | Stevens et al. |
| 3,433,752 A | 3/1969  | Zagoren et al. |
| 4,105,567 A | 8/1978  | Koerner et al. |
| 4,124,572 A | 11/1978 | Mao |
| 4,228,277 A | 10/1980 | Landoll |
| 4,284,682 A | 8/1981  | Tschirch et al. |
| 4,663,159 A | 5/1987  | Brode, II et al. |
| 5,124,445 A | 6/1992  | Just et al. |
| 5,242,751 A | 9/1993  | Hartman |
| 5,504,123 A | 4/1996  | Partan, III |
| 5,583,214 A * | 12/1996 | Partain, III ........... C08B 11/187 536/84 |
| 6,229,054 B1 | 5/2001 | Dai et al. |
| 8,450,446 B2 | 5/2013 | Fontana |
| 2004/0210029 A1 | 10/2004 | Fontana |
| 2005/0027043 A1 | 2/2005 | Yaoguang et al. |
| 2008/0207863 A1 | 8/2008 | Fontana |
| 2009/0215881 A1* | 8/2009 | Delaire ................. A61K 8/375 514/441 |
| 2012/0122691 A1 | 5/2012 | Daly et al. |
| 2012/0196998 A1 | 8/2012 | Iji et al. |

FOREIGN PATENT DOCUMENTS

| CN | 1550523 A | 12/2004 |
| GB | 1015611 A | 1/1966 |
| JP | 05086334 A | 4/1993 |
| JP | 06033395 A | 2/1994 |
| JP | 06-265465 A | 9/1994 |
| JP | 08-231918 A | 9/1996 |
| JP | 10-008035 A | 1/1998 |
| JP | 11-255801 A | 9/1999 |
| JP | 2000-159802 A | 6/2000 |
| JP | 2001-032869 A | 2/2001 |
| JP | 2001-181302 A | 7/2001 |
| JP | 2008-174869 A | 7/2008 |

OTHER PUBLICATIONS

Wasserman, D., et al., "Cashew nutshell liquid," Ind. Eng. Chem., Apr. 1945, 396-399.*
Thielking, H., et al., "Cellulose Ethers," Ullmann's Encyclopedia of Industrial Chemistry, published online 2006, vol. 7, 381-397.*
Gelo-Pujic., M., et al., "Synthesis of new antioxidant conjugates and their in vitro hydrolysis with Stratum corneum enzymes," International Journal of Cosmetic Science, 2008, 30, 195-204.*
Partain, Emmett M., "The Synthesis of Hydrophobe-Modified Hydroxyetyl Cellulose Polymers Using 3-n-Pentadecenyl Phenyl Glycidyl Ether", Polymer Preprints, 1998, pp. 82-83, vol. 39, No. 2.
Mair, Peter, et al., "Cellulose Bound Chlorophenols II: Preparation and Characterization of Phenyloxycarbonylpentanoyl Celluloses Dependence of Substitution on Chlorophenol Structure", Journal of Applied Polymer Science, 1987, pp. 1345-1351, vol. 34, No. 4.
Shaikh, V. A. E., et al., "Thermotropic Behavior of Cholesterol-Linked Polysaccharides", Journal of Applied Polymer Science, 1998, pp. 195-201, vol. 70, No. 1.
John, George, et al., "Grafting of bio-monomers—1. Cationic graft copolymerisation of cardanol using borontrifluoridediethyletherate onto cellulose", Polymer Bulletin, 1989, pp. 89-94, vol. 22, No. 1.
Kuruvilla, Joesph, et al., "Effect of chemical treatment on the tensile properties of short sisal fibre-reinforced polyethylene composites", Polymer, Jan. 1996, pp. 5139-5149, vol. 37 No. 23.
Search Report dated Jun. 18, 2013, issued by the European Patent Office corresponding to application 10821949.4.

(Continued)

*Primary Examiner* — Liam J Heincer
*Assistant Examiner* — Nicholas Hill
(74) *Attorney, Agent, or Firm* — Sughrue Mion, PLLC

(57) ABSTRACT

A cellulose resin produced by binding cardanol or a derivative thereof to cellulose or a derivative thereof with the use of a cellulose hydroxy group of the cellulose or a derivative thereof and the phenolic hydroxy group of the cardanol or a derivative thereof.

18 Claims, No Drawings

(56) References Cited

OTHER PUBLICATIONS

John et al., "Grafting of bio-monomers: 1. Catonic graft copolymerisation of cardanol using borontrifluoridediethyletherate onto cellulose", Polymer Bulletin, 1989, pp. 89-94, vol. 22.

Hussain, "Rapid Communication: Unconventional Synthesis and characterization of novel abietic acid esters of hydroxyproplycellulose as potential macromolecular prodrugs", Journal of Polymer Science Part A: Polymer Chemistry, 2008, pp. 747-752, vol. 46.

Notification of the First Office Action for CN Application No. 201080054974.8 dated Aug. 13, 2013 (with English Translation).

Lui et al., "Synthesis of CNSL Modified novalac phenolic resin and properties of its molding composite", China Plastics, 2005, pp. 70-73, vol. 19, No. 11.

Tyman et al., "The separation and synthesis of lipidic 1,2 and 1,3 diols from natrual phenolic lipids for the complexation and recovery of boron", Chemistry and Physics of Lipids, 2003, pp. 177-179, vol. 126.

Butvar Polyvinyl Butyral Resin, Properties and Uses, Eastman, Nov. 2013, pp. 1-29.

Majewicz, T. G., et al., "Cellulose Ethers," Kirk-Othmer Encyclopedia of Chemical Technology, vol. 5, 445-466. Published online Dec. 4, 2000.

Butts, M., et al., "Silicones," Kirk-Othmer Encyclopedia of Chemical Technology. Published online 2002.

English-language Machine Translation of JP2008-174869. Performed on the JPO website on Jan. 9, 2013.

Pillai, C. K. S., et al., "Advanced polymers: investigations on the influence of molecular design, structural parameters, intermolecular forces and process design on properties," Metals Materials and Processes, 2001, pp. 161-178, vol. 13.

* cited by examiner

CELLULOSE RESIN AND METHOD FOR PRODUCING THE SAME

CROSS-REFERENCE TO RELATED APPLICATIONS

This application is a Divisional of U.S. patent application Ser. No. 13/500,247, filed on Apr. 4, 2012, which is a National Stage of International Application No. PCT/JP2010/067333, filed on Oct. 4, 2010, which claims priority from Japanese Patent Application No. 2010-156238 filed Jul. 8, 2010, Japanese Patent Application No. 2010-105509, filed Apr. 30, 2010, and Japanese Patent Application No. 2009-231670 filed Oct. 5, 2009, the contents of all of which are incorporated herein by reference in their entirety.

TECHNICAL FIELD

The present invention relates to a cellulose resin and a method for producing the same.

BACKGROUND ART

Bioplastic using a plant as a raw material can contribute to a countermeasure against petroleum depletion and global warming, and has been started being used not only in common products such as packaging, containers and fibers but also in durable products such as electronics and automobiles.

However, general bioplastics, such as polylactic acid, polyhydroxyalkanoate and modified starch, all use starch materials, more precisely, edible parts, as raw materials. Accordingly, for fear of future food shortage, it has been desired to develop a novel bioplastic using a non-edible part as a raw material.

As bioplastic using a non-edible part as a raw material, various types of bioplastics using cellulose, which is a main component of non-edible parts of wood and plant, have been already developed and commercialized.

Cellulose is a high molecular weight compound formed by polymerization of β-glucose. Since cellulose has high crystallinity, it is hard, fragile and absent of thermoplasticity. In addition, since cellulose contains many hydroxy groups, water absorbability is high and water resistance is low. Then, various investigations have been made to improve the properties of cellulose.

For example, Patent Literature 1 (JP11-255801A) discloses a biodegradable graft polymer having thermoplasticity obtained by ring-opening graft polymerization of cellulose acetate having a hydroxy group with ε-caprolactone.

Meanwhile, a material using a non-edible component other than cellulose has been developed. For example, cardanol derived from cashew nutshell, since it has stable amount of production and excellent functionality ascribed to its characteristic molecular structure, has found various applications.

As an example of using cardanol, Patent Literature 2 (JP10-8035A) discloses a friction material for brake, which is formed of a fiber base material made of an aramid pulp and a cellulose fiber, and a filler made of calcium carbonate and cashew dust, with the use of a binder made of a phenol resin. Patent Literature 3 (JP2001-32869A) discloses a friction material formed of a base material made of an aramid fiber and a cellulose fiber, and a filler made of graphite and cashew dust, with the use of an organic-inorganic composite binder. It is described that the friction material is applied to clutch facing of a power transmission system of automobiles etc.

In Non Patent Literature 1 (George John et al., Polymer Bulletin, 22, p. 89-94 (1989)), it is described that water resistance of paper can be improved by soaking a paper sheet in cardanol to perform a grafting reaction through which cardanol binds to cellulose constituting the paper sheet. It is described that, in the grafting reaction, a terminal double bond of cardanol binds to a hydroxy group of cellulose in the presence of boron trifluoride diethyl ether ($BF_3$—$OEt_2$).

CITATION LIST

Patent Literature

Patent Literature 1: JP11-255801A
Patent Literature 2: JP10-8035A
Patent Literature 3: JP2001-32869A

Non Patent Literature

Non Patent Literature 1: George John et al., Polymer Bulletin, 22, p. 89-94 (1989)

SUMMARY OF INVENTION

Technical Problem

Cellulose bioplastic, whose properties are influenced by inherent properties of cellulose, is insufficient in strength, heat resistance, water resistance and thermoplasticity. These properties need to be improved particularly when cellulose bioplastic is applied to durable products such as packaging for electronic devices.

Cellulose bioplastic has another problem. When a plasticizer is added in order to improve thermoplasticity, heat resistance and strength (in particular, rigidity) decrease, and also decrease in uniformity and bleed out of a plasticizer (a plasticizer bleeds out in the surface of a compact) occur. Furthermore, when a plasticizer formed of a petroleum feedstock is added in a large amount, the utilization ratio of plants (vegetism) decreases.

An object of the present invention is to provide a cellulose resin having improved thermoplasticity, mechanical characteristics and water resistance and having a high vegetism and a high utilization ratio of a non-edible part, and to provide a method for producing the cellulose resin.

Solution to Problem

According to an exemplary aspect, there is provided a cellulose resin produced by binding cardanol or a derivative thereof to cellulose or a derivative thereof with the use of a cellulose hydroxy group of the cellulose or a derivative thereof and the phenolic hydroxy group of the cardanol or a derivative thereof.

According to another exemplary aspect, there is provided a molding material including the above cellulose resin as a base resin.

According to another exemplary aspect, there is provided a resin composition including the above cellulose resin and a thermoplastic polyurethane elastomer or a modified silicone compound.

According to another exemplary aspect, there is provided a method for producing a cellulose resin, including:

reacting a multifunctional compound capable of reacting with a hydroxy group of cellulose and the phenolic hydroxy group of cardanol, with cardanol to form a cardanol derivative, and reacting the cardanol derivative with cellulose or a derivative thereof to bind the cardanol derivative to the cellulose or a derivative thereof.

Advantageous Effects of Invention

According to the present invention, it is possible to provide a cellulose resin having improved thermoplasticity, mechanical characteristics and water resistance and having a high vegetism and a high utilization ratio of a non-edible part, and to provide a method for producing the cellulose resin.

DESCRIPTION OF EMBODIMENTS

According to an exemplary embodiment, a cellulose resin is obtained by binding cardanol (or a derivative thereof) to cellulose (or a derivative thereof) in the form of graft (hereinafter referred to as "grafting").

Owing to such grafting, mechanical characteristics (particularly toughness) and water resistance can be improved. Furthermore, since good thermoplasticity is provided by the grafting, the amount of plasticizer to be added can be reduced or a plasticizer may not be added. As a result, heat resistance and strength (particularly rigidity) can be suppressed from reducing compared to the cellulose resin containing a plasticizer, and homogeneity of the resultant resin can be improved. In addition, a problem of bleed out can be overcome. Furthermore, since the addition amount of plasticizer made of a petroleum feedstock can be lowered or reduced to zero, vegetism can be enhanced. In addition, since cellulose and cardanol are both derived from non-edible parts of plants, the utilization ratio of non-edible parts can be increased.

Cellulose is a straight-chain polymer of β-glucose, represented by the following formula (1) and each glucose unit has three hydroxy groups. Using these hydroxy groups, cardanol (or a derivative thereof) can be grafted.

[Formula 1]

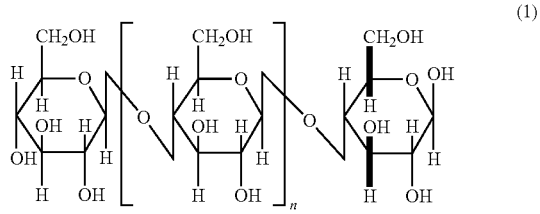

(1)

Cellulose is a main component of plants and can be obtained by a separation treatment for removing other components such as lignin from the plants. Other than the cellulose thus obtained, cellulose obtained by purification of cotton or pulp rich in cellulose content can be used, or the cotton or pulp can be directly used.

The polymerization degree of cellulose (or a derivative thereof) preferably falls within the range of 50 to 5000 and more preferably 100 to 3000 in terms of glucose polymerization degree. If the polymerization degree is extremely low, the strength and heat resistance of the produced resin may not be sufficient in some cases. Conversely, if the polymerization degree is extremely high, the melt viscosity of the produced resin is extremely high, interfering with molding in some cases.

Cellulose (or a derivative thereof) may be mixed with chitin and chitosan having an analogous structure. When cellulose is mixed with them, the amount thereof is preferably 30% by mass or less relative to the total amount of mixture, preferably 20% by mass or less and further preferably 10% by mass or less.

A cellulose derivative herein refers to cellulose having hydroxy groups partly acylated, etherified or grafted. Specific examples thereof include organic acid esters such as cellulose acetate, cellulose butyrate and cellulose propionate; inorganic acid esters such as cellulose nitrate, cellulose sulfate and cellulose phosphate; mixed esters such as cellulose acetate propionate, cellulose acetate butyrate, cellulose acetate phthalate and cellulose acetate nitrate; and etherified cellulose such as methylcellulose, hydroxyethylcellulose and hydroxypropylcellulose. Furthermore, celluloses grafted with styrene, (meth)acrylic acid, (meth)acrylate, ε-caprolactone, lactide, glycolide, etc. These acylated cellulose, etherified cellulose and grafted cellulose may be used singly or in combination of two or more types.

As the cellulose (or a derivative thereof) of the exemplary embodiment, for example, at least one acylated cellulose selected from a cellulose acetate, cellulose propionate and cellulose butyrate, which have hydroxy groups partially acylated, can be preferably used.

The term "cellulose derivative" used herein includes both a cellulose compound and a compound having a cellulose skeleton obtained by biologically or chemically introducing a functional group into raw-material cellulose.

Cardanol is a component contained in the shell of cashew nut, and is an organic compound represented by the following formula (2), which has a phenol moiety and a straight-chain hydrocarbon moiety. There are 4 types of cardanols different in the number of unsaturated bonds in the straight-chain hydrocarbon moiety R. Usually, cardanol is a mixture of these 4 components. To be more specific, cardanol is a mixture of 3-pentadecylphenol, 3-pentadecylphenol monoene, 3-pentadecylphenol diene and 3-pentadecylphenol triene, described in the following formula (2). A cardanol component obtained by extracting and purifying from a cashew nutshell liquid can be used.

[Formula 2]

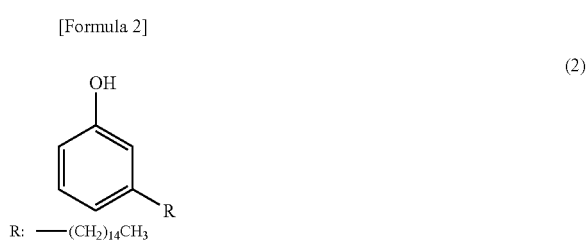

(2)

The straight-chain hydrocarbon moiety of cardanol contributes to improving flexibility and hydrophobicity of a resin, whereas the phenol moiety has a highly reactive phenolic hydroxy group for use in grafting. When such cardanol (or a derivative thereof) is grafted to cellulose (or a derivative thereof), a cellulose structure to which cardanol (or a derivative thereof) is added like bristles is formed. As a result, cardanol bristles thus grafted interact with each other to improve mechanical characteristics (particularly toughness), as well as to impart thermoplasticity. In addition, owing to hydrophobicity of cardanol, water resistance can be improved.

Grafting can be performed through a binding reaction by dehydration between the phenolic hydroxy group of cardanol (or a derivative thereof) and a hydroxy group of cellulose (or a derivative thereof). At this time, a dehydration catalyst such as sulfuric acid, toluene sulfonic acid and hydrogen chloride can be added. As a result, a cellulose carbon atom to which a hydroxy group of cellulose (or a derivative thereof) is bound and a cardanol carbon atom to which the phenolic hydroxy group of cardanol (or a derivative thereof) is bound are linked via an oxygen atom.

Also, grafting can be performed by use of a multifunctional compound capable of reacting with a hydroxy group of cellulose and the phenolic hydroxy group of cardanol. As a result, a cellulose carbon atom to which a hydroxy group of cellulose (or a derivative thereof) is bound and a cardanol carbon atom to which the phenolic hydroxy group of cardanol (or a derivative thereof) is bound are linked via an organic linking group. According to such grafting, efficiency of a grafting reaction can be improved and a side reaction can be suppressed.

The organic linking group may have a first bond binding to the cellulose carbon atom, the bond being selected from an ester bond, an ether bond and a urethane bond, and a second bond binding to the cardanol carbon atom, the bond being selected from an ester bond, an ether bond and a urethane bond.

For example, this multifunctional compound and cardanol are bound by use of the phenolic hydroxy group of cardanol and one of the functional groups of the multifunctional compound, and the resultant cardanol derivative and cellulose (or a derivative thereof) can be bound by use of a hydroxy group of cellulose (or a derivative thereof) and the functional group (the functional group derived from the multifunctional compound) of the cardanol derivative.

According to the aforementioned grafting, the hydroxy group of cellulose (or a derivative thereof) and the hydroxy group of cardanol (or a derivative thereof) are eliminated to form a graft bond; at the same time, the hydrophobic structure of cardanol can be introduced into cellulose (or a derivative thereof) to improve water resistance.

To graft cardanol (or a derivative thereof) to cellulose (or a derivative thereof), the phenolic hydroxy group of cardanol and a hydroxy group of cellulose are preferably used as mentioned above in view of efficiency of a grafting reaction, resultant molecular structure and water resistance. Since such grafting is made by use of a highly-reactive phenolic hydroxy group, more efficient grafting can be realized compared to grafting using an unsaturated bond (double bond) of the straight-chain hydrocarbon moiety of cardanol. Furthermore, according to the grafting of the exemplary embodiment, since the phenol moiety of cardanol reacts with cellulose and fixed to it, interaction between mutual straight-chain hydrocarbon moieties of the grafted cardanol molecules enhances, and thus a desired effect of improving mechanical characteristics can be obtained. Furthermore, in the exemplary embodiment, grafting is performed by eliminating the phenolic hydroxy group of cardanol, water resistance can be improved (suppressing water absorbability) compared to grafting that does not use a phenolic hydroxy group. Also from this point of view, the grafting of the exemplary embodiment is advantageous.

The aforementioned multifunctional compounds and organic linking groups preferably include a hydrocarbon group. The number of carbon atoms of the hydrocarbon group is preferably 1 or more and more preferably 2 or more, and also preferably 20 or less, more preferably 14 or less and further preferably 8 or less. If the number of carbon atoms is excessively large, the molecule becomes excessively large and thus reactivity reduces. As a result, it is often difficult to increase a grafting rate. As such a hydrocarbon group, a divalent group is preferable. Examples thereof include a divalent straight-chain aliphatic hydrocarbon groups (particularly, straight-chain alkylene group) such as a methylene group, an ethylene group, a propylene group, a butylene group, a pentamethylene group, a hexamethylene group, a heptamethylene group, an octamethylene group, a decamethylene group, a dodecamethylene group and a hexadecamethylene group; divalent alicyclic hydrocarbon groups such as a cycloheptane ring group, a cyclohexane ring group, a cyclooctane ring group, a bicyclopentane ring group, a tricyclohexane ring group, a bicyclooctane ring group, a bicyclononane ring group and a tricyclodecane ring group; divalent aromatic hydrocarbon groups such as a benzene ring group, a naphthalene ring group and a biphenylene group; and divalent groups composed of combinations of these.

When the hydrocarbon group as mentioned above is an aromatic hydrocarbon group or an alicyclic hydrocarbon group, because of its stiffness, the rigidity of the resultant resin can be improved. In contrast, when the hydrocarbon group is a straight-chain aliphatic hydrocarbon group, because of its flexibility, the toughness of the resultant resin can be improved.

As a functional group of a multifunctional compound as mentioned above, a group selected from a carboxyl group, a carboxylic acid anhydride group, a carboxylic halide group (particularly, carboxylic chloride group), an acryl group, an epoxy group, an isocyanate group and a halogen group is preferred. Of them, a carboxyl group, a carboxylic acid anhydride group, a halogen group (particularly, a chloride group) and an isocyanate group are preferred. As the functional group to be reacted with the phenolic hydroxy group of cardanol, particularly, a carboxylic acid anhydride group, a halogen group (particularly, chloride group) and an isocyanate group are preferred. As the functional group to be reacted with a hydroxy group of cellulose, particularly, a carboxylic halide group (particularly, a carboxylic chloride group), an acid anhydride group, an acryl group and an isocyanate group are preferred. The carboxylic halide group can be formed by converting a carboxyl group before grafting into an acid halide group. The acid anhydride group may be an oligomer composed of acid anhydrides.

Specific examples of such a multifunctional compound include dicarboxylic acid, carboxylic acid anhydride, dicarboxylic acid halide, monochlorocarboxylic acid, acrylic acid and a derivative thereof, and diisocyanates. Examples of the dicarboxylic acid include malonic acid, succinic acid, glutaric acid, pimelic acid, suberic acid, azelaic acid, sebacic acid, dodecane dicarboxylic acid, pentadecane dicarboxylic acid and hexadecane dicarboxylic acid. Examples of the carboxylic acid anhydride include anhydrides of these dicarboxylic acids and maleic anhydride. The maleic anhydride may be an oligomer composed of maleic anhydrides. Examples of the dicarboxylic acid halide include acid halides of these dicarboxylic acids. Examples of the monochlorocarboxylic acid include monochloroacetic acid, 3-chloropropionic acid, 3-fluoropropionic acid, 4-chlorobutyric acid, 4-fluorobutyric acid, 5-chlorovaleric acid, 5-fluorovaleric acid, 6-chlorohexanoic acid, 6-fluorohexanoic acid, 8-chlorooctanoic acid, 8-fluorooctanoic acid, 12-chlorododecanoic acid, 12-fluorododecanoic acid, 18-chlorostearic acid and 18-fluorostearic acid. Examples of the acrylic acid and a derivative thereof include acrylic acid, acrylyl chloride, methacrylic acid and methacrylyl chloride. Examples of the diisocyanates include tolylene diisocyanate (TDI), 4,4'-diphenylmethane diisocyanate (MDI), 1,5-naphthylene diisocyanate (NDI), tolidine diisocyanate, 1,6-hexamethylene diisocyanate (HDI), isophorone diisocyanate (IPDI), xylylene diisocyanate (XDI), hydrogenated XDI, triisocyanate, tetramethylxylene diisocyanate (TMXDI), 1,6,11-undecane triisocyanate, 1,8-diisocyanatemethyloctane, lysine ester triisocyanate, 1,3,6-hexamethylene triisocyanate, bicycloheptane triisocyanate and dicyclohexylmethane diisocyanate (HMDI: hydrogenated MDI). Of these, tolylene diisocyanate (TDI), 4,4'-diphenylmethane diisocyanate (MDI) and 1,6-hexamethylene diisocyanate (HDI) can be preferably used.

One of the functional groups of a multifunctional compound as mentioned above and the phenolic hydroxy group of cardanol are reacted to form a cardanol derivative, and then, the cardanol derivative is bound to cellulose (or a derivative thereof) by use of a hydroxy group of cellulose (or a derivative thereof) and the functional group (derived from the multifunctional compound) of the cardanol derivative.

For example, a carboxylic acid-based multifunctional compound (dicarboxylic acid, carboxylic acid anhydride or monochloro carboxylic acid) is reacted with cardanol, the phenolic hydroxy group of the cardanol and a functional group of the multifunctional compound (carboxyl group, carboxylic acid anhydride group or halogen group (particularly, chloride group)) are reacted to form a cardanol derivative, and the remaining functional group (carboxyl group) is converted into a carboxylic halide group (particularly, carboxylic chloride group). The cardanol derivative is reacted with cellulose (or a derivative thereof) to react a hydroxy group of the cellulose (or a derivative thereof) with the carboxylic halide group of the cardanol derivative. In this way, grafting can be performed. In this case, grafting can be extremely efficiently performed.

As a result of grafting using a multifunctional compound, the cellulose carbon atom to which a hydroxy group of cellulose (or a derivative thereof) is bound and the hydrocarbon group of a multifunctional compound are allowed to bind, for example, via an ester bond, an ether bond or a urethane bond, preferably via an ester bond; whereas the cardanol carbon atom to which the phenolic hydroxy group of cardanol (or a derivative thereof) is bound and the hydrocarbon group of the multifunctional compound are allowed to bind, for example, via an ester bond, an ether bond or a urethane bond, preferably via an ester bond or an ether bond.

An unsaturated bond(s) (double bond) of the straight-chain hydrocarbon moiety of the cardanol are preferably hydrogenated and converted into a saturation bond. The conversion rate (hydrogenation rate) of the unsaturated bonds by hydrogenation is preferably 90% by mole or more and more preferably 95% by mole or more. After hydrogenation, the residual ratio (the number of unsaturated bonds per cardanol molecule) of unsaturated bonds of the cardanol is preferably 0.2 (bonds/molecule) or less and more preferably 0.1 (bond/molecule) or less. Furthermore, the aromatic ring of the phenol moiety of cardanol may be hydrogenated and converted into a cyclohexane ring.

When cardanol (or a derivative thereof), in which a large number of unsaturated bonds still remain in the straight-chain hydrocarbon moiety, is grafted to cellulose (or a derivative thereof), a side reaction likely to occur, with the result that grafting cannot be efficiently performed and the solubility of a grafted product in a solvent may often significantly reduce. When a cardanol derivative in which an unsaturated bond(s) of the straight-chain hydrocarbon moiety are sufficiently converted into saturated bonds by hydrogenation, is grafted, grafting can be efficiently performed while suppressing a side reaction and in addition, solubility reduction of a grafted product in a solvent can be suppressed.

The hydrogenation method is not particularly limited and a method known in the art can be used. Examples of the catalyst include a precious metal such as palladium, ruthenium and rhodium, nickel, and a substance made by immobilizing a metal selected from these on a carrier such as activated carbon, activated alumina and diatom earth. As the reaction system, a batch system in which a reaction is performed while suspending and stirring a powdery catalyst and a continuous system using a reaction tower charged with a molded catalyst can be employed. The solvent for hydrogenation may not be used depending upon the system of hydrogenation. However, when a solvent is used, examples of the solvent include alcohols, ethers, esters and saturated hydrocarbons generally. The reaction temperature for hydrogenation is not particularly limited; however, it can be usually set to 20 to 250° C. and preferably 50 to 200° C. If the reaction temperature is excessively low, a hydrogenation rate becomes low. Conversely, if the reaction temperature is excessively high, the amount of decomposition product may increase. The hydrogen pressure during the hydrogenation can be usually set to 10 to 80 kgf/cm$^2$ ($9.8 \times 10^5$ to $78.4 \times 10^5$ Pa) and preferably 20 to 50 kgf/cm$^2$ ($19.6 \times 10^5$ to $49.0 \times 10^5$ Pa).

Hydrogenation can be performed before the cardanol derivative is formed, after the cardanol derivative is formed and before the cardanol derivative is grafted, or after the cardanol derivative is grafted; however, in view of the reaction efficiency of hydrogenation and grafting reaction, hydrogenation is preferably performed before the cardanol derivative is grafted and further preferably before the cardanol derivative is formed.

The ratio (grafting rate) of cardanol (or a derivative thereof) bound to cellulose (or a derivative thereof) relative to the cellulose (or a derivative thereof) is represented by the number (average value) of cardanol molecules (or a derivative thereof) to be added per glucose unit of cellulose (or a derivative thereof), in other words, the number (average value) of hydroxy groups bound to cardanol molecules (or a derivative thereof) per glucose unit of cellulose (or a derivative thereof) (the degree of substitution of the hydroxy group, $DS_{CD}$). $DS_{CD}$ is preferably 0.1 or more, and more preferably 0.2 or more. $DS_{CD}$ may be set to 0.4 or more. When $DS_{CD}$ is excessively low, the effect by grafting may not be sufficiently obtained.

The maximum value of $DS_{CD}$ is theoretically "3"; however, in view of facilitating production (grafting), $DS_{CD}$ is preferably 2.5 or less, more preferably 2 or less and further preferably 1.5 or less. Furthermore, $DS_{CD}$ may be 1 or less; even in this case, sufficient improvement effect can be obtained. If $DS_{CD}$ increases, tensile breaking strain (toughness) tends to increase; whereas, the maximum strength (tensile strength, bending strength) tends to decrease. Accordingly, $DS_{CD}$ is preferably set appropriately in accordance with desired properties.

Cardanol (or a derivative thereof) is grafted, and further a specific reactive hydrocarbon compound may be grafted to cellulose (or a derivative thereof). Owing to this, a cellulose resin can be improved so as to have desired properties.

This reactive hydrocarbon compound is a compound having at least one functional group capable of reacting with a hydroxy group of cellulose (or a derivative thereof). Examples thereof include hydrocarbon compounds having a carboxyl group, a carboxylic halide group, a carboxylic acid anhydride group, an isocyanate group and an acryl group. Specific examples thereof include at least one compound selected from monocarboxylic acids such as an aliphatic monocarboxylic acid, an aromatic monocarboxylic acid and an alicyclic monocarboxylic acid, and acid halides or acid anhydrides thereof; at least one compound selected from an aliphatic monoisocyanate, an aromatic monoisocyanate and an alicyclic monoisocyanate; an acrylic acid ester; and a methacrylic acid ester. Examples of the aliphatic monocarboxylic acid include straight and branched (having a side chain) fatty acids. Examples of the aromatic monocarboxylic acid include an aromatic monocarboxylic acid having a carboxyl group directly bound to an aromatic ring, and an aromatic monocarboxylic acid having a carboxyl group bound to the aromatic ring via an alkylene group (for example, methylene group, ethylene group) (the acid having an aliphatic carboxylic acid group bound to the aromatic ring). Examples of the alicyclic monocarboxylic acid include an alicyclic monocarboxylic acid having a carboxyl group directly bound to an alicycle, and an alicyclic monocarboxylic acid having a carboxyl group bound to an alicycle via an alkylene group (for example, methylene group, ethylene group)(the acid having an aliphatic carboxylic acid group bound to an alicycle). Examples of the aliphatic monoisocyanate include an aliphatic monoisocyanate obtained by reacting an aliphatic diisocyanate and a straight or branched (having a side chain) aliphatic monoalcohol in a molar ratio of 1:1. Examples of the aromatic monoisocyanate include an aromatic monoisocyanate obtained by reacting an aromatic diisocyanate and a straight or branched (having a side chain) aliphatic monoalcohol in a molar ratio of 1:1. Examples of the acrylic acid ester and methacrylic acid ester include esters of an acrylic acid or methacrylic acid with a straight or branched (having a side chain) aliphatic monoalcohol.

The reactive hydrocarbon compound preferably has carbon atoms within the range of 1 to 32 and more preferably within the range of 1 to 20. If the number of carbon atoms is excessively large, the size of the molecule becomes excessively large and reaction efficiency decreases due to steric hindrance. As a result, it becomes difficult to increase a grafting rate.

The reactive hydrocarbon compound is effective in improving properties in the case where it is particularly arranged so as to bury gaps in a sterical structure of a grafted cardanol (or a derivative thereof).

When the hydrocarbon group of the reactive hydrocarbon compound is an aromatic hydrocarbon group and an alicyclic hydrocarbon group, it efficiently works to particularly improve rigidity and heat resistance. When the hydrocarbon group is an aliphatic hydrocarbon group, it efficiently works to particularly improve toughness.

Examples of the aliphatic monocarboxylic acid to be used as the reactive hydrocarbon compound include saturated fatty acids such as acetic acid, propionic acid, butyric acid, valeric acid, caproic acid, enanthic acid, caprylic acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid; unsaturated fatty acids such as butenoic acid, pentenoic acid, hexenoic acid, octenoic acid, undecylenic acid, oleic acid, sorbic acid, linoleic acid, linolenic acid and arachidonic acid; and derivatives of these. These may further have a substituent.

Examples of the aromatic monocarboxylic acid used as the reactive hydrocarbon compound include an aromatic carboxylic acid having a carboxyl group introduced in a benzene ring such as benzoic acid; an aromatic carboxylic acid having an alkyl group introduced in a benzene ring such as toluic acid; an aromatic carboxylic acid having an aliphatic carboxylic acid group introduced in a benzene ring such as phenylacetic acid and phenyl propionic acid; an aromatic carboxylic acid having two or more benzene rings such as biphenylcarboxylic acid and biphenylacetic acid; an aromatic carboxylic acid having a condensed-ring structure such as naphthalene carboxylic acid and tetralin carboxylic acid; and derivatives of these.

Examples of the alicyclic monocarboxylic acid to be used as the reactive hydrocarbon compound include an alicyclic monocarboxylic acid having a carboxyl group introduced to an alicycle such as cyclopentane carboxylic acid, cyclohexane carboxylic acid and cyclooctane carboxylic acid; alicyclic monocarboxylic acids having an aliphatic carboxylic acid introduced in an alicycle such as cyclohexyl acetic acid; and derivatives of these.

If an organic silicon compound and an organic fluorine compound are added to these reactive hydrocarbon compound structures, properties such as water resistance can be more effectively improved.

As the reactive functional groups of these reactive hydrocarbon compounds, any reactive functional groups are used as long as they can react with a hydroxy group of cellulose. Examples thereof include a carboxyl group, a carboxylic acid halide group (particularly, a carboxylic acid chloride group), and a carboxylic acid anhydride, and further include an epoxy group, an isocyanate group and a halogen group (particularly, a chloride group). Of these, a carboxyl group and a carboxylic halide group are preferable and a carboxylic acid chloride group is particularly preferable. Examples of the carboxylic acid halide group (particularly, a carboxylic acid chloride group) include an acid halide group (particularly, an acid chloride group) in which a carboxyl group of each of the carboxylic acids mentioned above is acid-halogenated.

As the reactive hydrocarbon compound used in the exemplary embodiment, particularly in view of rigidity (bending strength, etc.) of a resin, at least one monocarboxylic acid selected from aromatic carboxylic acids and alicyclic carboxylic acids, or an acid halide or acid anhydride thereof are preferable. By adding such a reactive hydrocarbon compound to a cellulose hydroxy group, a structure formed by adding an acyl group derived from at least one monocarboxylic acid selected from aromatic carboxylic acids and alicyclic carboxylic acids to a cellulose hydroxy group (i.e., a structure obtained by substituting a hydrogen atom of cellulose hydroxyl group with an acyl group) can be obtained.

The number (average value) of reactive hydrocarbon compounds (the number of acyl groups) to be added per glucose unit of cellulose (or a derivative thereof), in other words, the number (average value) of hydroxy groups bound to a reactive hydrocarbon compound per glucose unit (the degree of substitution of the hydroxy group, $DS_{XX}$) is, in view of obtaining a desired effect, preferably 0.1 or more and 0.6 or less and more preferably 0.1 or more and 0.5 or less. Furthermore, after cardanol (or a derivative thereof) and a reactive hydrocarbon compound are grafted, the number (average value) of remaining hydroxy groups per glucose unit (hydroxy group remaining degree, $DS_{OH}$) is, in view of sufficiently ensuring water resistance, preferably 0.9 or less and more preferably, 0.7 or less.

The reactive hydrocarbon compound can be grafted in the grafting step of cardanol (or a derivative thereof). Owing to this, grafting can be made uniformly. At this time, these may be added simultaneously or separately. However, if cardanol (or a derivative thereof) is grafted and thereafter a reactive hydrocarbon compound is added and grafted, the efficiency of a grafting reaction can be improved.

A grafting treatment can be performed by heating cellulose (or a derivative thereof) and cardanol (or a derivative thereof), if necessary, a reactive hydrocarbon compound in a solvent dissolving them at an appropriate temperature. Cellulose is rarely dissolved in a general solvent; however dissolved in e.g., a dimethylsulfoxide-amine solvent, a dimethylformamide-chloral-pyridine solvent, a dimethylacetamide-lithium chloride solvent and an imidazolium ionic liquid. When a grafting reaction is performed in a general solvent, a cellulose derivative, the solubility of which has been changed by previously binding a carboxylic acid or an alcohol to a part of hydroxy groups of cellulose to reduce intermolecular force, can be used. Acylated cellulose, in which the hydrogen atom of a hydroxy group is substituted with an acyl group such as an acetyl group, a propionyl group and a butyryl group, is preferable. In particular, cellulose acetate, which is a cellulose acetylated by acetic acid or acetyl chloride, is preferable. Acetic acid, propionic acid, butyric acid and an acid halide and acid anhydride thereof are included in the aforementioned reactive hydrocarbon compounds; however, like this example, whole or part of predetermined reactive hydrocarbon compounds can be added (grafted) to a hydroxy group of cellulose before grafting with cardanol (or a derivative thereof).

The remaining cellulose hydroxy group that is not used in grafting cardanol (or a derivative thereof) is a hydroxy group without being modified, a hydroxy group to be modified by acetylation, or a hydroxy group to which a reactive hydrocarbon compound is added (grafted). As the amount of hydroxy group increases, maximum strength and heat resistance tend to increase; whereas water absorbability tends to increase. As the conversion rate (degree of substitution) of hydroxy groups increases, water absorbability tends to decrease, plasticity and breaking strain tend to increase; whereas, maximum strength and heat resistance tend to decrease. In consideration of these tendencies and grafting conditions, the conversion rate of hydroxy groups can be appropriately set.

In view of ensuring sufficient water resistance, the number (average value) of remaining hydroxy groups of a cellulose resin grafted per glucose unit (hydroxy group remaining degree, $DS_{OH}$) is preferably 0.9 or less and more preferably 0.7 or less.

In view of water absorbability, mechanical strength and heat resistance, it is preferred that the cellulose hydroxy groups are partly acylated with a reactive hydrocarbon as mentioned above. Furthermore, in view of the aforementioned grafting treatment of cardanol (or a derivative thereof), it is preferred that cellulose hydroxy groups are appropriately acylated (particularly, acetylated) before grafting of cardanol (or a derivative thereof). The number of acyl groups (average value) to be added per glucose unit of cellulose (or a derivative thereof), in other words, the number of hydroxy groups acylated (degree of substitution of the hydroxy group, $DS_{AC}$) (average value) is preferably 0.5 or more in view of obtaining sufficient acylation effect, more preferably 1.0 or more, and further preferably 1.5 or more. Furthermore, in view of ensuring the sufficient grafting rate ($DS_{CD}$) of cardanol (or a derivative thereof), the degree of substitution of the hydroxy group, $DS_{AC}$ by acylation is preferably 2.7 or less, more preferably 2.5 or less and further preferably 2.2 or less. The acyl group to be added by acylation is preferably at least one acyl group selected from an acetyl group, a propionyl group and a butyryl group. Note that the degree of acetylation is represented by $DS_{Ace}$, the degree of propionation is represented by $DS_{Pr}$, and the degree of butylation is represented by $DS_{Bu}$.

In the cellulose resin of the exemplary embodiment, in view of ensuring a sufficient plant utilization ratio, the mass ratio (plant component ratio) of the sum of a cellulose component and a cardanol component relative to the total cellulose resin grafted is preferably 50% or more, and more preferably 60% or more. The cellulose component herein corresponds to the structure represented by Formula (1) where hydroxy groups are not acylated or grafted, whereas the cardanol component corresponds to the structure represented by Formula (2). On the assumption of these, calculation is made to obtain the mass ratio.

To the cellulose resin of the exemplary embodiment described above, various types of additives usually used in thermoplastic resins can be applied. For example, if a plasticizer is added, thermoplasticity and breaking elongation can be more improved. Examples of such a plasticizer include phthalic esters such as dibutyl phthalate, diaryl phthalate, diethyl phthalate, dimethyl phthalate, di-2-methoxyethyl phthalate, ethyl phthalyl ethyl glycolate and methyl phthalyl ethyl glycolate; tartaric acid esters such as dibutyl tartrate; adipic acid esters such as dioctyl adipate and diisononyl adipate; polyhydric alcohol esters such as triacetin, diacetyl glycerin, tripropionitrile glycerin and glyceryl monostearate; phosphoric acid esters such as triethyl phosphate, triphenyl phosphate and tricresyl phosphate; dibasic fatty acid esters such as dibutyl adipate, dioctyl adipate, dibutyl azelate, dioctyl azelate and dioctyl sebacate; citric acid esters such as triethyl citrate, acetyltriethyl citrate and tributyl acetylcitrate; epoxylated vegetable oils such as epoxylated soybean oil and epoxylated linseed oil; castor oil and a derivative thereof; benzoic acid esters such as ethyl O-benzoyl benzoate; aliphatic dicarboxylic acid esters such as sebacate and azelate; unsaturated dicarboxylic acid esters such as maleate; and N-ethyl toluene sulfonamide, triacetin, O-cresyl p-toluenesulfonate and tripropionin.

Examples of other plasticizers include cyclohexane dicarboxylic acid esters such as dihexyl cyclohexanedicarboxylate, dioctyl cyclohexanedicarboxylate and di-2-methyloctyl cyclohexanedicarboxylate; trimellitic acid esters such as dihexyl trimellitate, diethylhexyl trimellitate and dioctyl trimellitate; and pyromellitic acid esters such as dihexyl pyromellitate, diethylhexyl pyromellitate and dioctyl pyromellitate.

The reactive functional group (a carboxylic acid group, a group derived from a carboxylic acid group, other functional groups) of such a plasticizer may be reacted with a hydroxy group or an unsaturated bond of cardanol to allow cardanol to add to a plasticizer. If such a plasticizer is used, compatibility of the cellulose resin of the exemplary embodiment and the plasticizer can be improved. Therefore, the addition effect of the plasticizer can be more improved.

To the cellulose resin of the exemplary embodiment, if necessary, an inorganic or organic granular or fibrous filler can be added. By adding a filler, strength and rigidity can be more improved. Examples of the filler include, mineral particles (talc, mica, baked siliceous earth, kaolin, sericite, bentonite, smectite, clay, silica, quartz powder, glass beads, glass powder, glass flake, milled fiber, Wollastonite, etc.), boron-containing compounds (boron nitride, boron carbonate, titanium boride etc.), metal carbonates (magnesium carbonate, heavy calcium carbonate, light calcium carbonate, etc.), metal silicates (calcium silicate, aluminum silicate, magnesium silicate, magnesium aluminosilicate, etc.), metal oxides (magnesium oxide etc.), metal hydroxides (aluminum hydroxide, calcium hydroxide, magnesium hydroxide, etc.), metal sulfates (calcium sulfate, barium sulfate, etc.), metal carbides (silicon carbide, aluminum carbide, titanium carbide, etc.), metal nitrides (aluminum nitride, silicon nitride, titanium nitride, etc.), white carbon and metal foils. Examples of the fibrous filler include organic fibers (natural fiber, papers etc.), inorganic fibers (glass fiber, asbestos fiber, carbon fiber, silica fiber, silica alumina fiber, Wollastonite, zirconia fiber, potassium titanate fiber etc.) and metal fibers. These fillers can be used singly or in combination of two or more types.

To the cellulose resin of the exemplary embodiment, if necessary, a flame retardant can be added. By adding a flame retardant, flame resistance can be imparted. Examples of the flame retardant include metal hydrates such as magnesium hydroxide, aluminum hydroxide and hydrotalcite, basic magnesium carbonate, calcium carbonate, silica, alumina, talc, clay, zeolite, bromine-based flame retardant, antimony trioxide, phosphoric acid based flame retardant (aromatic phosphate, aromatic condensed phosphate, etc.), compounds containing phosphorus and nitrogen (phosphazene compound), etc. These flame retardants can be used singly or in combination with two or more types.

Furthermore, as the flame retardant, a reaction product between a phosphorus oxide, a phosphoric acid or a derivative of each of these and cardanol, and a polymers of the reactant can be used. If such a flame retardant is used, the interaction between the cellulose resin of the exemplary embodiment and a flame retardant is enhanced, excellent flame-retardant effect can be obtained. Examples of such a flame retardant include a reaction product between phosphorus oxide ($P_2O_5$) or phosphoric acid ($H_3PO_4$) and a hydroxy group of cardanol, and a polymer obtained by adding hexamethylene tetramine to the reactant followed by polymerizing.

To the cellulose resin of the exemplary embodiment, if necessary, a shock resistance improver can be added. By adding a shock resistance improver, shock resistance can be improved. Examples of the shock resistance improver include a rubber component and a silicone compound. Examples of the rubber component include a natural rubber, epoxylated natural rubber and synthesized rubber. Furthermore, examples of the silicone compound include organic polysiloxane formed by polymerization of alkyl siloxane, alkyl phenyl siloxane, etc., and modified silicone compounds obtained by modifying a side chain or an end of an organic polysiloxane as mentioned above with polyether, methylstyryl, alkyl, higher fatty acid ester, alkoxy, fluorine, an amino group, an epoxy group, a carboxyl group, a carbinol group, a methacryl group, a mercapto group, a phenol group etc. These shock resistance improvers can be used singly or in combination of two or more types.

As the silicone compound, a modified silicone compound (modified polysiloxane compound) is preferred. As the modified silicone compound, a modified polydimethyl siloxane is preferred, which has a structure having a main chain constituted of dimethyl siloxane repeat units and a side chain or a terminal methyl group partly substituted with an organic substituent containing at least one group selected from an amino group, an epoxy group, a carbinol group, a phenol group, a mercapto group, a carboxyl group, a methacryl group, a long-chain alkyl group, an aralkyl group, a phenyl group, a phenoxy group, an alkyl phenoxy group, a long-chain fatty acid ester group, a long-chain fatty acid amide group and a polyether group. The modified silicone compound, because of the presence of such an organic substituent, is improved in affinity for the aforementioned cardanol-added cellulose resin and dispersibility in the cellulose resin is improved. Consequently, a resin composition excellent in shock resistance can be obtained.

As such a modified silicone compound, a modified silicone compound produced in accordance with a conventional method or a commercially available product can be used.

Examples of the organic substituent contained in the modified silicone compound include the organic substituents represented by the following formulas (3) to (21):

[Formula 3]

(3)

(4)

[Formula 4]

(5)

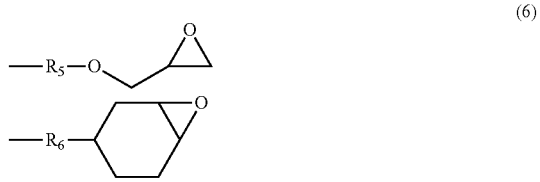

(6)

[Formula 5]

(8)

(9)

(10)

(11)

[Formula 6]

(12)

[Formula 7]

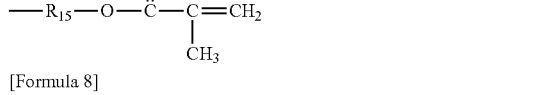

(13)

[Formula 8]

(14)

-continued

[Formula 9]

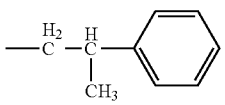  (15)

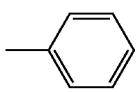  (16)

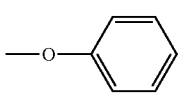  (17)

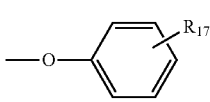  (18)

[Formula 10]

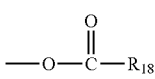  (19)

[Formula 11]

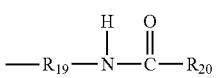  (20)

[Formula 12]

  (21)

where a and b each represent an integer of 1 to 50.

In the aforementioned formulas, $R_1$ to $R_{10}$, $R_{12}$ to $R_{15}$, $R_{19}$ and $R_{21}$ each represent a divalent organic group. Examples of the divalent organic group include alkylene groups such as a methylene group, an ethylene group, a propylene group and a butylene group; alkyl arylene groups such as a phenylene group and a tolylene group; oxyalkylene groups and polyoxyalkylene groups such as —$(CH_2$—$CH_2$—$O)_c$— (c represents an integer from 1 to 50), —$[CH_2$—$CH(CH_3)$—$O]_d$— (d represents an integer from 1 to 50), and —$(CH_2)_e$—NHCO— (e represents an integer from 1 to 8). Of these, an alkylene group is preferable and particularly, an ethylene group and a propylene group are preferable.

In the aforementioned formulas, $R_{11}$, $R_{16}$ to $R_{18}$, $R_{20}$ and $R_{22}$ each represent an alkyl group having 1 to 20 carbon atoms. Examples of the alkyl group include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group and a pentadecyl group. Furthermore, the structures of the above alkyl groups may have one or more unsaturated bonds.

The total average content of organic substituents in a modified silicone compound desirably falls within the range where the modified silicone having an appropriate particle diameter (for example, 0.1 μm or more and 100 μm or less) can be dispersed in a matrix, i.e., a cardanol-added cellulose resin, during a process for producing a cellulose resin composition. If a modified silicone compound having an appropriate particle diameter is dispersed in a cardanol-added cellulose resin, stress concentration on the periphery of a silicone region having a low elastic modulus effectively occurs. As a result, a resin compact having excellent shock resistance can be obtained. The total average content of such organic substituents is preferably 0.01% by mass or more and more preferably 0.1% by mass or more, and also preferably 70% by mass or less and more preferably 50% by mass or less. If an organic substituent is contained appropriately, the modified silicone compound can be improved in affinity for a cellulose resin, the modified silicone compound having an appropriate particle diameter can be dispersed in a cardanol-added cellulose resin, and further bleed out due to separation of the modified silicone compound in a molding can be suppressed. If the total average content of the organic substituents is excessively low, it becomes difficult to disperse a modified silicone compound having an appropriate particle diameter in a cardanol-added cellulose resin.

If an organic substituent of the modified polydimethyl siloxane compound is an amino group, an epoxy group, a carbinol group, a phenol group, a mercapto group, a carboxyl group or a methacryl group, the average content of the organic substituent in the modified polydimethyl siloxane compound can be obtained by the following Expression (I).

$$\text{Organic substituent average content}(\%)=(\text{organic substituent formula-weight/organic substituent equivalent})\times 100 \quad (I)$$

In the Expression (I), the organic substituent equivalent is an average mass of a modified silicone compound per organic substituent (1 mole).

When the organic substituent of the modified polydimethyl siloxane compound is a phenoxy group, an alkylphenoxy group, a long-chain alkyl group, an aralkyl group, a long-chain fatty acid ester group or a long-chain fatty acid amide group, the average content of the organic substituent of the modified polydimethyl siloxane compound can be obtained from the following Expression (II).

$$\text{Organic substituent average content}(\%)=x\times w/[(1-x)\times 74+x\times(59+w)]\times 100 \quad (II)$$

In the Expression (II), x is an average molar fraction of the organic substituent-containing a siloxane repeat unit relative to all siloxane repeat units of the modified polydimethyl siloxane compound; and w is the formula weight of the organic substituent.

In the case where the organic substituent of the modified polydimethyl siloxane compound is a phenyl group, the average content of the phenyl group in the modified polydimethyl siloxane compound can be obtained by the following Expression (III).

$$\text{Phenyl group average content}(\%)=154\times x/[74\times(1-x)+198\times x]\times 100 \quad (III)$$

In the Expression (III), x is an average molar fraction of the phenyl group-containing siloxane repeat unit relative to all siloxane repeat units in the modified polydimethyl siloxane compound (A).

In the case where the organic substituent of the modified polydimethyl siloxane compound is a polyether group, the average content of the polyether group in the modified polydimethyl siloxane compound can be obtained by the following Expression (IV).

$$\text{Polyether group average content}(\%)=\text{HLB value}/20\times 100 \quad (IV)$$

In the Expression (IV), the HLB value represents the degree of affinity of a surfactant for water and oil, and is defined by the following Expression (V) based on the Griffin Act.

$$\text{HLB value}=20\times(\text{sum of formula weights of hydrophilic moieties/molecular weight}) \quad (V)$$

To the cellulose resin of the exemplary embodiment, two or more modified silicone compounds having different affinities to the resin may be added. In this case, dispersibility of a relative low-affinity modified silicone compound (A1) is improved by a relative high-affinity modified silicone compound (A2) to obtain a cellulose resin composition having even more excellent shock resistance. The total average content of an organic substituent of the relatively low-affinity modified silicone compound (A1) is preferably 0.01% by mass or more and more preferably 0.1% by mass or more and also preferably 15% by mass or less and more preferably 10% by mass or less. The total average content of an organic substituent of the relatively high-affinity modified silicone compound (A2) is preferably 15% by mass or more and more preferably 20% by mass or more and also preferably 90% by mass or less.

The blending ratio (mass ratio) of the modified silicone compound (A1) to the modified silicone compound (A2) can be set to fall within the range of 10/90 to 90/10.

In a modified silicone compound, dimethyl siloxane repeat units and organic substituent-containing siloxane repeat units each of which may be homologously and continuously connected, alternately connected or connected at random. A modified silicone compound may have a branched structure.

The number average molecular weight of a modified silicone compound is preferably 900 or more and more preferably 1000 or more, and also preferably 1000000 or less, more preferably 300000 or less and further preferably 100000 or less. If the molecular weight of a modified silicone compound is sufficiently large, loss by vaporization can be suppressed in kneading with a melted cellulose resin during a process for producing a cardanol-added cellulose resin compound. Furthermore, if the molecular weight of a modified silicone compound is appropriate (not excessively large), a uniform molding having good dispersibility can be obtained.

As the number average molecular weight, a value (calibrated by a polystyrene standard sample) obtained by measuring a 0.1% chloroform solution of a sample by GPC can be employed.

The addition amount of such a modified silicone compound is preferably, in view of obtaining sufficient addition effect, 1% by mass or more relative to the total cellulose resin composition (particularly, the sum of the cellulose resin and the modified silicone compound) and more preferably 2% by mass or more. In view of sufficiently ensuring properties of a cellulose resin such as strength and suppressing bleed out, the addition amount of a modified silicone compound is preferably 20% by mass or less and more preferably 10% by mass or less.

By adding such a modified silicone compound to a cellulose resin, the modified silicone compound having an appropriate particle diameter (for example, 0.1 to 100 μm) can be dispersed in the resin and the shock resistance of a resin composition can be improved.

As the shock resistance improver, a cardanol polymer containing cardanol as a main component may be used. Such a shock resistance improver has excellent compatibility with the cellulose resin of the exemplary embodiment and therefore a higher shock resistance improving effect can be obtained. Specific examples thereof include a cardanol polymer obtained by adding formaldehyde to cardanol and reacting this mixture with an unsaturated bond in the straight-chain hydrocarbon of cardanol; and a cardanol polymer obtained by adding a catalyst such as sulfuric acid, phosphoric acid or diethoxytrifluoroboron and reacting unsaturated bonds of the straight-chain hydrocarbon of cardanol with each other.

To the cellulose resin of the exemplary embodiment, if necessary, additives such as a colorant, an antioxidant and a heat stabilizer may be added as long as they are applied to conventional resin compositions.

To the cellulose resin of the exemplary embodiment, if necessary, a general thermoplastic resin may be added.

Particularly, by adding a thermoplastic resin having excellent flexibility such as a thermoplastic polyurethane elastomer (TPU), shock resistance can be improved. The addition amount of such a thermoplastic resin (particularly, TPU) is, in view of obtaining sufficient addition effect, preferably 1% by mass or more and more preferably 5% by mass or more relative to the total composition containing the cellulose resin of the exemplary embodiment (particularly, to the total amount of the cellulose resin and the thermoplastic resin (particularly, TPU)). In view of ensuring the properties of a cellulose resin such as strength and suppressing bleed out, the addition amount of thermoplastic resin is preferably 20% by mass or less and more preferably 15% by mass or less.

The thermoplastic polyurethane elastomer (TPU) suitable for improving shock resistance that can be used includes a polyurethane elastomer prepared by from a polyol, a diisocyanate and a chain extender.

Examples of the polyol include polyester polyol, polyester ether polyol, polycarbonate polyol and polyether polyol.

Examples of the polyester polyol include a polyester polyol obtained by a dehydration condensation reaction between a polyvalent carboxylic acid such as an aliphatic dicarboxylic acid (succinic acid, adipic acid, sebacic acid, azelaic acid, etc.), an aromatic dicarboxylic acid (phthalic acid, terephthalic acid, isophthalic acid, naphthalene dicarboxylic acid, etc.), an alicyclic dicarboxylic acid (hexahydrophthalic acid, hexahydroterephthalic acid, hexahydroisophthalic acid, etc.), or an acid ester or an acid anhydride of each of these, and a polyol such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,3-octane diol, 1,9-nonane diol, or a mixture of these; and a polylactone diol obtained by ring-opening polymerization of a lactone monomer such as ε-caprolactone.

Examples of the polyester ether polyol include a compound obtained by a dehydration condensation reaction between a polyvalent carboxylic acid such as an aliphatic dicarboxylic acid (succinic acid, adipic acid, sebacic acid, azelaic acid, etc.), an aromatic dicarboxylic acid (phthalic acid, terephthalic acid, isophthalic acid, naphthalene dicarboxylic acid, etc.), an alicyclic dicarboxylic acid (hexahydrophthalic acid, hexahydroterephthalic acid, hexahydroisophthalic acid, etc.), or an acid ester or an acid anhydride of each of these, and a glycol such as diethylene glycol or an alkylene oxide adduct (propylene oxide adduct etc.) or a mixture of these.

Examples of the polycarbonate polyol include a polycarbonate polyol obtained by reacting one or two or more polyols such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,8-octane diol, 1,9-nonane diol and diethylene glycol with diethylene carbonate, dimethyl carbonate, diethyl carbonate, etc.; and further may include a copolymer of a polycaprolactone polyol (PCL) and a polyhexamethylene carbonate (PHL).

Examples of the polyether polyol include a polyethylene glycol, polypropylene glycol and polytetramethylene ether glycol, each of which is obtained by polymerizing respective cyclic ethers: ethylene oxide, propylene oxide and tetrahydrofuran; and copolyethers of these.

Examples of the diisocyanate to be used in formation of TPU include tolylene diisocyanate (TDI), 4,4'-diphenylmethane diisocyanate (MDI), 1,5-naphthylene diisocyanate (NDI), tolidine diisocyanate, 1,6-hexamethylene diisocyanate (HDI), isophorone diisocyanate (IPDI), xylylene diisocyanate (XDI), hydrogenated XDI, triisocyanate, tetramethyl xylene diisocyanate (TMXDI), 1,6,11-undecane triisocyanate, 1,8-diisocyanatemethyl octane, lysine ester triisocyanate, 1,3,6-hexamethylene triisocyanate, bicycloheptane triisocyanate and dicyclohexyl methane diisocyanate (hydrogenated MDI; HMDI). Of these, 4,4'-diphenylmethane diisocyanate (MDI) and 1,6-hexamethylene diisocyanate (HDI) are preferably used.

Examples of the chain extender to be used in formation of TPU, a low-molecular weight polyol can be used. Examples of the low-molecular weight polyol include aliphatic polyols such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,8-octane diol, 1,9-nonane diol, diethylene glycol and 1,4-cyclohexane dimethanol and glycerin; and aromatic glycols such as 1,4-dimethylolbenzene, bisphenol A and ethylene oxide or a propylene oxide adduct of bisphenol A.

When a silicone compound is copolymerized with a thermoplastic polyurethane elastomer (TPU) obtained from these materials, further excellent shock resistance can be obtained.

These thermoplastic polyurethane elastomers (TPU) may be used singly or in combination.

A method for producing a resin composition containing the cellulose resin of the exemplary embodiment, additives and a thermoplastic resin, is not particularly limited. For example, the resin composition can be produced by melting and mixing additives and the cellulose resin manually by handmixing or by use of a known mixer such as a tumbler mixer, a ribbon blender, a single-axial or a multiaxial mixing extruder, and a compounding apparatus such as a kneader and kneading roll and, if necessary, granulating the mixture into an appropriate shape. In another preferable process, additives dispersed in solvent such as an organic solvent and a resin are mixed and furthermore, if necessary, a coagulation solvent is added to obtain a mixed composition of the additives and the resin and thereafter, the solvent is evaporated.

The cellulose resin according to the exemplary embodiments mentioned above can be used as a base resin for a molding material. The molding material formed of a resin composition containing the cellulose resin as a base resin is suitable for forming housing such as packaging for an electronic device.

The base resin herein refers to a main component of a composition and means that other components may be contained as long as the components do not prevent the function of the main component. The content rate of the main component is not particularly limited; however, the content rate of the main component in a composition is preferably 50% by mass or more, more preferably 70% by mass or more, further preferably 80% by mass or more and particularly preferably 90% by mass or more.

EXAMPLES

The present invention will be more specifically described by way of examples below.

Synthesis Example 1

Cardanol Derivative 1 (Preparation of Chloridized and Succinic Acid-Modified Cardanol)

Hydrogenated cardanol (m-n-pentadecylphenol manufactured by ACROS Organics), in which an unsaturated bond(s) of the straight-chain hydrocarbon moiety of cardanol are hydrogenated, was used as a raw material. When the hydrogenated cardanol was measured by $^1$H-NMR (product name: AV-400, 400 MHz, manufactured by Bruker), no unsaturated bond was detected. Thus, it was confirmed that a hydrogenation rate is at least 90% by mole or more. The phenolic hydroxy group of the cardanol was reacted with succinic anhydride to add a carboxyl group to obtain carboxylated and hydrogenated cardanol. Next, the carboxyl group was converted into an acid chloride group by chloridizing it with oxalyl chloride to obtain chloridized and hydrogenated cardanol. More specifically, the chloridized and hydrogenated cardanol was prepared in accordance with the following procedure.

First, succinic anhydride (33 g (0.33 mol)) was dissolved in dehydrated chloroform (250 mL). To this, dehydrated pyridine (5.0 mL (0.062 mol)) and a raw material, i.e., hydrogenated cardanol (50 g (0.16 mol)) were added. The reaction solution was heated to reflux under a nitrogen atmosphere at 70° C. for 24 hours, cooled to room temperature. Thereafter, a crystal of succinic anhydride precipitated was separated by filtration. The chloroform solution filtrated was washed twice with 0.1 mol/L hydrochloric acid (250 mL) and further washed twice with water (250 mL). After washing, the chloroform solution was dehydrated with magnesium sulfate and magnesium sulfate was separated by filtration and chloroform was distillated away under reduced pressure to obtain a brown solid substance of carboxylated and hydrogenated cardanol (60 g (0.15 mol)).

The resultant carboxylated and hydrogenated cardanol (50 g (0.12 mol) was dissolved in dehydrated chloroform (250 mL). To this, oxalyl chloride (24 g (0.19 mol)) and N,N-dimethylformamide (0.25 mL (3.2 mmol)) were added. The reaction solution was stirred at room temperature for 72 hours. Chloroform, excessive oxalyl chloride and N,N-dimethylformamide were distillated away under reduced pressure to obtain chloridized and hydrogenated cardanol (52 g (0.12 mol).

Synthesis Example 2

Cardanol Derivative 2 (Preparation of Chloridized and Monochloroacetic Acid-Modified Cardanol)

Hydrogenated cardanol (m-n-pentadecylphenol manufactured by ACROS Organics), in which an unsaturated bond(s) of the straight-chain hydrocarbon moiety of cardanol are hydrogenated, was used as a raw material. The phenolic hydroxy group of the cardanol was reacted with monochloroacetic acid to add a carboxyl group to obtain carboxylated and hydrogenated cardanol. Next, the carboxyl group was converted into an acid chloride group by chloridizing it with oxalyl chloride to obtain chloridized and hydrogenated cardanol. More specifically, the chloridized and hydrogenated cardanol was prepared in accordance with the following procedure.

First, hydrogenated cardanol (80 g (0.26 mol)) was dissolved in methanol (120 mL). To this, an aqueous solution of sodium hydroxide (64 g (1.6 mol)) dissolved in distilled water (40 mL) was added. Thereafter, at room temperature, a solution of monochloro acetic acid (66 g (0.70 mol)) (manufactured by Kanto Chemical Co., Inc.) dissolved in methanol (50 mL) was added dropwise. After completion of the dropwise addition, the reaction solution was continuously stirred while refluxing at 73° C. for 4 hours. The reaction solution was cooled to room temperature and the reaction mixture was acidified with a diluted hydrochloric acid until pH became 1. To this, methanol (250 mL) and diethyl ether (500 mL) and further distilled water (200 mL) were added. The resultant water layer was separated by a separating funnel and discarded. The ether layer was washed twice with distilled water (400 mL). To the ether layer, magnesium anhydride was added to dry the ether layer and then separated by filtration. The filtrate (ether layer) was concentrated by an evaporator (90° C./3 mmHg) under reduced pressure to obtain a yellow brown powdery crude product as the residue. The crude product was recrystallized from n-hexane and dried under vacuum to obtain white powder of carboxylated and hydrogenated cardanol (46 g (0.12 mol)).

The resultant carboxylated and hydrogenated cardanol (46 g (0.12 mol)) was dissolved in dehydrated chloroform (250 mL). To this, oxalyl chloride (24 g (0.19 mol)) and N,N-dimethylformamide (0.25 mL (3.2 mmol) were added. The mixture was stirred at room temperature for 72 hours. Chloroform, excessive oxalyl chloride and N,N-dimethylformamide were distillated away under reduced pressure to obtain chloridized and hydrogenated cardanol (48 g (0.13 mol)).

Synthesis Example 3

Preparation of Biphenylacetyl Chloride

Biphenylacetic acid (6.0 g (0.028 mol)) manufactured by Sigma-Aldrich Co. LLC was dissolved in dehydrated chloroform (60 ml). To this, oxalyl chloride (3.7 g (0.029 mol)) and N,N-dimethylformamide (0.04 ml (0.51 mmol)) were added. The mixture was stirred at room temperature for 72 hours. Chloroform, excessive oxalyl chloride and N,N-dimethylformamide were distillated away under reduced pressure to obtain biphenylacetyl chloride (6.5 g (0.028 mol)).

Example 1

The chloridized and hydrogenated cardanol (cardanol derivative 1) prepared in Synthesis Example 1 was allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (46 g (0.11 mol)) prepared in Synthesis Example 1 was added. The reaction solution was heated to reflux at 100° C. for 6 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (20 g).

The obtained sample (grafted cellulose acetate) was measured by $^1$H-NMR (product name: AV-400, 400 MHz, manufactured by Bruker), and $DS_{CD}$ was 0.90.

Furthermore, the sample was evaluated in the following procedure. The results are shown in Table 1A.

[Evaluation of Thermoplasticity (Press Moldability)]

Press molding was performed in the following conditions to obtain a compact. At that time, moldability was evaluated in accordance with the following criteria.

(Molding Conditions)

Temperature: 170° C., Time: 2 minutes, Pressure: 100 kgf ($9.8 \times 10^2$ N),

Size of compact: Thickness: 2 mm, Width: 13 mm, Length: 80 mm.

(Evaluation Criteria)

○: Good, Δ: not good (void, sink mark or partial uncharged portion was observed), x: cannot be molded.

[Measurement of Glass Transition Temperature (Heat Resistance Evaluation)]

Glass transition temperature was measured by DSC (product name: DSC6200, manufactured by Seiko Instruments Inc.).

[Bending Test]

The compact obtained by the aforementioned molding process was subjected to a bending test in accordance with JIS K7171.

[Tensile Test]

A solution of a sample (2 g) dissolved in chloroform (20 mL) was prepared. The solution was subjected to casting and a film of 10 mm in width, 60 mm in length and 0.2 mm in thickness was prepared by cutting out by a cutter knife. The film was subjected to a tensile test in accordance with JIS K7127.

[Measurement of Water Absorption Rate]

Water absorption rate was obtained by measurement in accordance with JIS K7209. More specifically, the compact was soaked in pure water for 24 hours at normal temperature. An increase of weight at this time was measured to obtain a weight increase rate.

[Determination of Plant-Component Ratio]

A cellulose component and a cardanol component were regarded as plant components. The total content rate (% by mass) of the plant components relative to the whole sample was obtained. Assuming that the cellulose component herein corresponds to that having a structure represented by Formula (1) above in which a hydroxy group is not acylated or grafted, and that the cardanol component corresponds to that having a structure represented by Formula (2) above, calculation was made.

Example 2

The chloridized and hydrogenated cardanol (cardanol derivative 1) prepared in Synthesis Example 1 was allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (23 g (0.054 mol)) prepared in Synthesis Example 1 was added. The reaction solution was heated to reflux at 100° C. for 6 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (16 g).

The obtained sample (grafted cellulose acetate) was measured by $^1$H-NMR (product name: AV-400, 400 MHz, manufactured by Bruker), and $DS_{CD}$ was 0.55.

Furthermore, the sample was evaluated in the same manner as in Example 1. The results are shown in Table 1A.

Example 3

The chloridized and hydrogenated cardanol (cardanol derivative 2) prepared in Synthesis Example 2 was allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (14 g (0.037 mol)) prepared in Synthesis Example 2 was added. The reaction solution was heated to reflux at 100° C. for 3 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (15 g).

The obtained sample (grafted cellulose acetate) was measured by $^1$H-NMR (product name: AV-400, 400 MHz, manufactured by Bruker), and $DS_{CD}$ was 0.55.

Furthermore, the sample was evaluated in the same manner as in Example 1. The results are shown in Table 1A.

Example 4

The chloridized and hydrogenated cardanol (cardanol derivative 2) prepared in Synthesis Example 2 was allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Example 3 except that the supply amount of the chloridized and hydrogenated cardanol was changed to 21 g (0.054 mol) to obtain grafted cellulose acetate (19 g).

The obtained sample (grafted cellulose acetate) was measured by $^1$H-NMR (product name: AV-400, 400 MHz, manufactured by Bruker), and $DS_{CD}$ was 0.80.

Furthermore, the sample was evaluated in the same manner as in Example 1. The results are shown in Table 1A.

Example 5

The chloridized and hydrogenated cardanol (cardanol derivative 2) prepared in Synthesis Example 2 was allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Example 3 except that the supply amount of chloridized and hydrogenated cardanol was changed to 12 g (0.031 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.44.

Furthermore, the sample was evaluated in the same manner as in Example 1. The results are shown in Table 1A.

Example 6

The chloridized and hydrogenated cardanol (cardanol derivative 2) prepared in Synthesis Example 2 was allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Example 3 except that the supply amount of the chloridized and hydrogenated cardanol was changed to 6.9 g (0.018 mol) to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.30.

Furthermore, the sample was evaluated in the same manner as in Example 1. The results are shown in Table 1A.

Example 7

The chloridized and hydrogenated cardanol (cardanol derivative 2) prepared in Synthesis Example 2 and benzoyl chloride (BC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (4.1 g (0.011 mol)) prepared in Synthesis Example 2 and benzoyl chloride (BC)(2.8 g (0.020 mol)) manufactured by Tokyo Kasei Kogyo Co., Ltd. was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.30 and $DS_{BC}$ was 0.14.

Furthermore, the sample was evaluated in the same manner as in Example 1. The results are shown in Table 1B.

Example 8

The chloridized and hydrogenated cardanol (cardanol derivative 2) prepared in Synthesis Example 2 and benzoyl chloride (BC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$=2.1) to obtain grafted cellulose acetate. More specifically, preparation was made in accordance with the same content and manner as in Example 7 except that the supply amount of the chloridized and hydrogenated cardanol was changed to 3.1 g (0.008 mol) and the supply amount of benzoyl chloride was changed to 8.4 g (0.060 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.22 and $DS_{BC}$ was 0.27.

Furthermore, the sample was evaluated in the same manner as in Example 1. The results are shown in Table 1B.

Example 9

The chloridized and hydrogenated cardanol (cardanol derivative 2) prepared in Synthesis Example 2 and benzoyl chloride (BC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$=2.1) to obtain grafted cellulose acetate. More specifically, preparation was made in accordance with the same content and manner as in Example 7 except that the supply amount of the chloridized and hydrogenated cardanol was changed to 7.6 g (0.020 mol) and the supply amount of benzoyl chloride was changed to 8.4 g (0.060 mol) to obtain grafted cellulose acetate (16 g).

The obtained sample (grafted cellulose acetate) was measured by $^1$H-NMR (product name: AV-400, 400 MHz, manufactured by Bruker), and $DS_{CD}$ was 0.44 and $DS_{BC}$ was 0.22.

Furthermore, the sample was evaluated in the same manner as in Example 1. The results are shown in Table 1B.

Example 10

The chloridized and hydrogenated cardanol (cardanol derivative 2) prepared in Synthesis Example 2 and benzoyl chloride (BC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$=2.1) to obtain grafted cellulose acetate. More specifically, preparation was made in accordance with the same content and manner as in Example 7 except that the supply amount of the chloridized and hydrogenated cardanol was changed to 4.1 g (0.011 mol) and the supply amount of benzoyl chloride was changed to 28.1 g (0.20 mol) to obtain grafted cellulose acetate (15 g).

The obtained sample (grafted cellulose acetate) was measured by $^1$H-NMR (product name: AV-400, 400 MHz, manufactured by Bruker), and $DS_{CD}$ was 0.24 and $DS_{BC}$ was 0.42.

Furthermore, the sample was evaluated in the same manner as in Example 1. The results are shown in Table 1B.

Example 11

The chloridized and hydrogenated cardanol (cardanol derivative 2) prepared in Synthesis Example 2 and benzoyl chloride (BC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$=2.1) to obtain grafted cellulose acetate. More specifically, preparation was made in accordance with the same content and manner as in Example 7 except that the supply amount of the chloridized and hydrogenated cardanol was changed to 4.6 g (0.012 mol) and the supply amount of benzoyl chloride was changed to 1.1 g (0.008 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.30 and $DS_{BC}$ was 0.07.

Furthermore, the sample was evaluated in the same manner as in Example 1. The results are shown in Table 1B.

Example 12

The chloridized and hydrogenated cardanol (cardanol derivative 2) prepared in Synthesis Example 2 and benzoyl chloride (BC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$=2.1) to obtain grafted cellulose acetate. More specifically, preparation was made in accordance with the same content and manner as in Example 7 except that the supply amount of the chloridized and hydrogenated cardanol was changed to 1.5 g (0.004 mol) and the supply amount of benzoyl chloride was changed to 2.2 g (0.016 mol) to obtain grafted cellulose acetate (12 g).

The obtained sample (grafted cellulose acetate) was measured by $^1$H-NMR (product name: AV-400, 400 MHz, manufactured by Bruker), and $DS_{CD}$ was 0.08 and $DS_{BC}$ was 0.16.

Furthermore, the sample was evaluated in the same manner as in Example 1. The results are shown in Table 1B.

Example 13

The chloridized and hydrogenated cardanol (cardanol derivative 2) prepared in Synthesis Example 2 and biphenylacetyl chloride (BAA) prepared in Synthesis Example 3 as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (7.0 g (0.018 mol)) prepared in Synthesis Example 2 and biphenylacetyl chloride (BAA)

(1.5 g (0.0065 mol)) prepared in Synthesis Example 3 was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.27 and $DS_{BAA}$ was 0.15.

Furthermore, the sample was evaluated in the same manner as in Example 1. The results are shown in Table 1B.

Example 14

The chloridized and hydrogenated cardanol (cardanol derivative 2) prepared in Synthesis Example 2 and biphenylacetyl chloride (BAA) prepared in Synthesis Example 3 as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Example 13 except that the supply amount of the chloridized and hydrogenated cardanol was changed to 12.2 g (0.032 mol) and the supply amount of biphenylacetyl chloride was changed to 4.6 g (0.020 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.40 and $DS_{BAA}$ was 0.40.

Furthermore, the sample was evaluated in the same manner as in Example 1. The results are shown in Table 1B.

Example 15

The chloridized and hydrogenated cardanol (cardanol derivative 2) prepared in Synthesis Example 2 and biphenylacetyl chloride (BAA) prepared in Synthesis Example 3 as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Example 13 except that the supply amount of the chloridized and hydrogenated cardanol was changed to 15.2 g (0.040 mol) and the supply amount of biphenylacetyl chloride was changed to 3.2 g (0.014 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.55 and $DS_{BAA}$ was 0.28.

Furthermore, the sample was evaluated in the same manner as in Example 1. The results are shown in Table 1B.

Example 16

The chloridized and hydrogenated cardanol (cardanol derivative 2) prepared in Synthesis Example 2 and biphenylacetyl chloride (BAA) prepared in Synthesis Example 3 as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Example 13 except that the supply amount of the chloridized and hydrogenated cardanol was changed to 7.6 g (0.020 mol) and the supply amount of biphenylacetyl chloride was changed to 7.4 g (0.032 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.30 and $DS_{BAA}$ was 0.52.

Furthermore, the sample was evaluated in the same manner as in Example 1. The results are shown in Table 1B.

Example 17

The chloridized and hydrogenated cardanol (cardanol derivative 2) prepared in Synthesis Example 2 and phenylpropionyl chloride (PPA) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (4.0 g (0.011 mol)) prepared in Synthesis Example 2 and phenylpropionyl chloride (PPA) (2.0 g (0.012 mol)) manufactured by Tokyo Kasei Kogyo Co., Ltd. was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.17 and $DS_{PPA}$ was 0.25.

Furthermore, the sample was evaluated in the same manner as in Example 1. The results are shown in Table 1C.

Example 18

The chloridized and hydrogenated cardanol (cardanol derivative 2) prepared in Synthesis Example 2 and phenylpropionyl chloride (PPA) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, preparation was made in accordance with the same content and manner as in Example 17 except that the supply amount of the chloridized and hydrogenated cardanol was changed to 3.8 g (0.010 mol) and the supply amount of phenylpropionyl chloride was changed to 2.7 g (0.016 mol) to obtain grafted cellulose acetate (14 g).

The obtained sample (grafted cellulose acetate) was measured by $^1$H-NMR (product name: AV-400, 400 MHz, manufactured by Bruker), and $DS_{CD}$ was 0.13 and $DS_{PPA}$ was 0.35.

Furthermore, the sample was evaluated in the same manner as in Example 1. The results are shown in Table 1C.

Example 19

The chloridized and hydrogenated cardanol (cardanol derivative 2) prepared in Synthesis Example 2 and cyclohexanecarboxylic acid chloride (CHC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (3.7 g (0.0096 mol)) prepared in Synthesis Example 2 and cyclohexanecarboxylic acid chloride (CHC) (2.5 g (0.017 mol)) manufactured by Sigma-Aldrich Co. LLC was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (13 g).

The obtained sample (grafted cellulose acetate) was measured by $^1$H-NMR (product name: AV-400, 400 MHz, manufactured by Bruker), and $DS_{CD}$ was 0.20 and $DS_{CHC}$ was 0.22.

Furthermore, the sample was evaluated in the same manner as in Example 1. The results are shown in Table 1C.

Example 20

The chloridized and hydrogenated cardanol (cardanol derivative 2) prepared in Synthesis Example 2 and biphenylcarbonyl chloride (BCC) as a reactive hydrocarbon were allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (4.6 g (0.012 mol)) prepared in Synthesis Example 2 and biphenylcarbonyl chloride (BCC) (13.0 g (0.060 mol)) manufactured by Sigma-Aldrich Co. LLC was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (16 g).

The obtained sample (grafted cellulose acetate) was measured by $^1$H-NMR (product name: AV-400, 400 MHz, manufactured by Bruker), and $DS_{CD}$ was 0.30 and $DS_{BCC}$ was 0.30.

Furthermore, the sample was evaluated in the same manner as in Example 1. The results are shown in Table 1C.

Example 21

The chloridized and hydrogenated cardanol (cardanol derivative 2) prepared in Synthesis Example 2 was allowed to bind to cellulose acetate (trade name: LM-40, manufactured by Daicel Chemical Industries, Ltd., the number of acetic acid molecules added to a single glucose unit of cellulose (degree of acetylation: $DS_{Ace}$)=2.4) to obtain grafted cellulose acetate. More specifically, the grafted cellulose acetate was prepared in accordance with the following procedure.

Cellulose acetate (15.8 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving the chloridized and hydrogenated cardanol (6.8 g (0.018 mol)) prepared in Synthesis Example 2 was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (19 g).

The obtained sample (grafted cellulose acetate) was measured by $^1$H-NMR (product name: AV-400, 400 MHz, manufactured by Bruker), and $DS_{CD}$ was 0.19.

Furthermore, the sample was evaluated in the same manner as in Example 1. The results are shown in Table 2.

Example 22

The chloridized and hydrogenated cardanol (cardanol derivative 2) prepared in Synthesis Example 2 was allowed to bind to cellulose acetate (trade name: LM-40, manufactured by Daicel Chemical Industries, Ltd., the number of acetic acid molecules added to a single glucose unit of cellulose (degree of acetylation: $DS_{Ace}$)=2.4) to obtain grafted cellulose acetate. More specifically, preparation was made in accordance with the same content and manner as in Example 22 except that the supply amount of chloridized and hydrogenated cardanol was changed to 41.2 g (0.108 mol) to obtain grafted cellulose acetate (25 g).

The obtained sample (grafted cellulose acetate) was measured by $^1$H-NMR (product name: AV-400, 400 MHz, manufactured by Bruker), and $DS_{CD}$ was 0.50.

Furthermore, the sample was evaluated in the same manner as in Example 1. The results are shown in Table 2.

Example 23

The chloridized and hydrogenated cardanol (cardanol derivative 2) prepared in Synthesis Example 2 was allowed to bind to cellulose acetate butyrate (trade name: CAB-381-20, manufactured by Eastman Chemical Company, the number of acetic acid molecules added to a single glucose unit of cellulose (degree of acetylation: $DS_{Ace}$)=1.0; the number of butyric acid molecules added to a single glucose unit of cellulose (degree of butyration: $DS_{Bu}$)=1.66) to obtain grafted cellulose acetate butyrate. More specifically, the grafted cellulose acetate butyrate was prepared in accordance with the following procedure.

Cellulose acetate butyrate (10 g (hydroxy-group amount: 0.011 mol)) was dissolved in dehydrated dioxane (200 mL). To this, triethylamine (2.5 ml (0.018 mol)) was added as a reaction catalyst and an acid trapping agent. To the solution, a dioxane solution (100 mL) dissolving the chloridized and hydrogenated cardanol (13 g (0.035 mol)) prepared in Synthesis Example 2 was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate butyrate (13 g).

The obtained sample (grafted cellulose acetate butyrate) was measured by $^1$H-NMR (product name: AV-400, 400 MHz, manufactured by Bruker), and $DS_{CD}$ was 0.34.

Furthermore, the sample was evaluated in the same manner as in Example 1. The results are shown in Table 3.

Example 24

The chloridized and hydrogenated cardanol (cardanol derivative 2) prepared in Synthesis Example 2 was allowed to bind to cellulose acetate propionate (trade name: CAP-482-20, manufactured by Eastman Chemical Company, the number of acetic acid molecules added to a single glucose unit of cellulose (degree of acetylation: $DS_{Ace}$)=0.18; the number of propionic acid molecules added to a single glucose unit of cellulose (degree of propionation: $DS_{Pr}$)=2.49) to obtain grafted cellulose acetate propionate. More specifically, the grafted cellulose acetate propionate was prepared in accordance with the following procedure.

Cellulose acetate propionate (10 g (hydroxy-group amount: 0.010 mol)) was dissolved in dehydrated dioxane (200 mL). To this, triethylamine (2.5 ml (0.018 mol)) was added as a reaction catalyst and an acid trapping agent. To the solution, a dioxane solution (100 mL) dissolving the chloridized and hydrogenated cardanol (13 g (0.035 mol)) prepared in Synthesis Example 2 was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate propionate (13 g).

The obtained sample (grafted cellulose acetate propionate) was measured by $^1$H-NMR (product name: AV-400, 400 MHz, manufactured by Bruker), and $DS_{CD}$ was 0.34.

Furthermore, the sample was evaluated in the same manner as in Example 1. The results are shown in Table 3.

Example 25

The chloridized and hydrogenated cardanol (cardanol derivative 2) prepared in Synthesis Example 2 and benzoyl chloride (BC) as a reactive hydrocarbon were allowed to bind to cellulose acetate propionate (trade name: CAP-482-20, manufactured by Eastman Chemical Company, the number of acetic acid molecules added to a single glucose unit of cellulose (degree of acetylation: $DS_{Ace}$)=0.18; the number of propionic acid molecules added to a single glucose unit of cellulose (degree of propionation: $DS_{Pr}$)=2.49) to obtain grafted cellulose acetate propionate. More specifically, the grafted cellulose acetate propionate was prepared in accordance with the following procedure.

Cellulose acetate propionate (10 g (hydroxy-group amount: 0.010 mol)) was dissolved in dehydrated dioxane (200 mL). To this, triethylamine (2.5 ml (0.018 mol)) was added as a reaction catalyst and an acid trapping agent. To the solution, a dioxane solution (100 mL) dissolving the chloridized and hydrogenated cardanol (4.5 g (0.012 mol)) prepared in Synthesis Example 2 and benzoyl chloride (BC)(2.8 g (0.020 mol)) manufactured by Tokyo Kasei Kogyo Co., Ltd. was added. The reaction solution was heated to reflux at 100° C. for 5 hours. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate propionate (13 g)).

The obtained sample (grafted cellulose acetate propionate) was measured by $^1$H-NMR (product name: AV-400, 400 MHz, manufactured by Bruker), and $DS_{CD}$ was 0.21 and $DS_{BC}$ was 0.10.

Furthermore, the sample was evaluated in the same manner as in Example 1. The results are shown in Table 3.

Example 26

Hydrogenated cardanol (m-n-pentadecylphenol manufactured by ACROS Organics), in which an unsaturated bond(s) of the straight-chain hydrocarbon moiety of cardanol are hydrogenated, was used as a raw material. The phenolic hydroxy group of the cardanol was reacted with monochloroacetic acid to add a carboxyl group to obtain carboxylated and hydrogenated cardanol. More specifically, the carboxylated and hydrogenated cardanol was prepared in accordance with the following procedure.

First, hydrogenated cardanol (80 g (0.26 mol)) was dissolved in methanol (120 mL). To this, an aqueous solution dissolving sodium hydroxide (64 g (1.6 mol)) in distilled water (40 mL) was added. Thereafter, at room temperature, a solution of monochloro acetic acid (66 g (0.70 mol)) manufactured by Kanto Chemical Co., Inc. dissolved in methanol (50 mL) was added dropwise. After completion of the dropwise addition, the reaction solution was continuously stirred while refluxing at 73° C. for 4 hours. The reaction solution was cooled to room temperature and the reaction mixture was acidified with a diluted hydrochloric acid until pH became 1. To this, methanol (250 mL) and diethyl ether (500 mL) and further distilled water (200 mL) were added. The resultant water layer was separated by a separating funnel and discarded. The ether layer was washed twice with distilled water (400 mL). To the ether layer, magnesium anhydride was added to dry the ether layer and then separated by filtration. The filtrate (ether layer) was concentrated by an evaporator (90° C./3 mmHg) under reduced pressure to obtain a yellow brown powdery crude product as the residue. The crude product was recrystallized from n-hexane and dried under vacuum to obtain white powder of carboxylated and hydrogenated cardanol (46 g (0.12 mol)).

The carboxylated and hydrogenated cardanol thus prepared was allowed to bind to cellulose (trade name: KC Flock W-50G manufactured by Nippon Paper Chemicals) to obtain grafted cellulose. More specifically, the grafted cellulose was prepared in accordance with the following procedure.

Cellulose (2.5 g (hydroxy-group amount: 47 mmol)) was suspended in methanol (100 mL) and stirred for one hour at room temperature and filtrated by suction. The solid substance separated by filtration was allowed to swell with dimethylacetamide (DMAc) (100 mL), stirred one hour at room temperature and filtrated by suction to remove the solvent. Thereafter, swelling with DMAc and solvent removal by suction filtration were repeated three times in the same manner. LiCl (21 g) was dissolved in DMAc (250 mL) and the DMAc-swollen cellulose previously obtained was mixed and stirred at room temperature overnight to obtain a cellulose solution. To the cellulose solution thus obtained, a DMAc solution (20 mL) dissolving the carboxylated and hydrogenated cardanol (17.3 g (46.5 mmol)), pyridine (11.0 g (140 mmol)) and tosyl chloride (8.8 g (46 mmol)) was added. The reaction solution was reacted by heating at 50° C. for one hour. The reaction solution was added dropwise to methanol (2 L) to allow reprecipitation. The resultant solid substance was separated by filtration, washed three times with methanol (500 mL) and dried under vacuum at 105° C. for 5 hours to obtain grafted cellulose (10.4 g). $DS_{CD}$ was obtained from the yield, and $DS_{CD}$ was 1.49. Furthermore, the sample was evaluated in the same manner as in Example 1. The results are shown in Table 4.

Comparative Example 1

The same cellulose acetate before grafting as that used in Example 1 was used as a comparative sample.

The cellulose acetate was evaluated in the same manner as in Example 1. The results are shown in Table 1C.

Note that the cellulose acetate did not melt even if heated and did not exhibit thermoplasticity. Furthermore, since the cellulose acetate could not be molded, a bending test was not performed.

Comparative Example 2

To the same cellulose acetate before grafting as that used in Example 1, triethyl citrate (trade name: Citroflex-2 manufactured by Pfizer Inc.) was added as a plasticizer such that the content became 45% by mass based on the whole resin composition. This was mixed by an extruder mixer (HAAKE MiniLab Rheomex extruder (Model CTW5, Thermo Electron Corp., Waltham, Mass.)) at a temperature of 200° C. and a screw rotation speed of 60 rpm to prepare a cellulose acetate resin composition.

The resin composition was evaluated in the same manner as in Example 1. The results are shown in Table 1C.

Note that when the resin composition was casted, a phase separation occurred and a uniform film could not be prepared. Thus, a tensile test was not performed.

Comparative Example 3

A cellulose acetate resin composition was prepared in accordance with the same content and manner as in Comparative Example 2 except that the addition amount of triethyl citrate was set to 56% by mass based on the whole resin composition.

The resin composition was evaluated in the same manner as in Example 1. The results are shown in Table 1C.

Note that when the resin composition was casted, a phase separation occurred and a uniform film could not be prepared. Thus, a tensile test was not performed.

Comparative Example 4

A cellulose acetate resin composition was prepared in accordance with the same content and manner as in Comparative Example 2 except that the addition amount of triethyl citrate was set to 34% by mass based on the whole resin composition.

The resin composition was evaluated in the same manner as in Example 1. The results are shown in Table 1C.

Note that when the resin composition was casted, a phase separation occurred and a uniform film could not be prepared. Thus, a tensile test was not performed.

Comparative Example 5

Phenylpropionyl chloride (PPA) was used as a reactive hydrocarbon and allowed to bind to cellulose acetate (trade name: LM-80, manufactured by Daicel Chemical Industries, Ltd., the number of acetic acid molecules added to a single glucose unit of cellulose (degree of acetylation: $DS_{Ace}$)=2.1) to obtain grafted cellulose acetate. More specifically, the grafted cellulose acetate was prepared in accordance with the following procedure.

Cellulose acetate (10 g (hydroxy-group amount: 0.036 mol)) was dissolved in dehydrated dioxane (200 mL). To this, triethylamine (5.0 ml (0.036 mol)) was added as a reaction catalyst and an acid trapping agent. To the solution, a dioxane solution (100 mL) dissolving phenylpropionyl chloride (PPA)(10 g (0.060 mol)) manufactured by Tokyo Kasei Kogyo Co., Ltd., was added. The reaction solution was heated to reflux at 100° C. for one hour. The reaction solution was slowly added dropwise to methanol (3 L) while stirring to allow reprecipitation. The resultant solid substance was separated by filtration, dried overnight in the air and further dried under vacuum at 105° C. for 5 hours to obtain grafted cellulose acetate (12 g).

The obtained sample (grafted cellulose acetate) was measured by $^1$H-NMR (product name: AV-400, 400 MHz, manufactured by Bruker), and $DS_{PPA}$ was 0.47.

The sample was evaluated in the same manner as in Example 1. The results are shown in Table 1C.

Note that the cellulose acetate did not melt even if heated and did not exhibit thermoplasticity. Furthermore, since the cellulose acetate could not be molded, a bending test was not performed.

Comparative Example 6

The same cellulose acetate before grafting ($DS_{Ace}$=2.4) as that used in Example 21 was used as a comparative sample.

The cellulose acetate was evaluated in the same manner as in Example 1. The results are shown in Table 2.

Note that the cellulose acetate did not melt even if heated and did not exhibit thermoplasticity. Furthermore, since the cellulose acetate could not be molded, a bending test was not performed.

Comparative Example 7

To the same cellulose acetate ($DS_{Ace}$=2.4) before grafting as that used in Example 21, triethyl citrate (trade name: Citroflex-2 manufactured by Pfizer Inc.) was added as a plasticizer such that the content became 20% by mass based on the whole resin composition. This was mixed by an extruder mixer (HAAKE MiniLab Rheomex extruder (Model CTW5, Thermo Electron Corp., Waltham, Mass.)) at a temperature of 190° C. and a screw rotation speed of 60 rpm) to prepare a cellulose acetate resin composition.

The resin composition was evaluated in the same manner as in Example 1. The results are shown in Table 2.

Note that when the resin composition was casted, a phase separation occurred and a uniform film could not be prepared. Thus, a tensile test was not performed.

Comparative Example 8

A cellulose acetate resin composition was prepared in accordance with the same content and manner as in Comparative Example 7 except that the addition amount of triethyl citrate was set to 40% by mass based on the whole resin composition.

The resin composition was evaluated in the same manner as in Example 1. The results are shown in Table 2.

Note that when the resin composition was casted, a phase separation occurred and a uniform film could not be prepared. Thus, a tensile test was not performed.

Comparative Examples 9 and 10

The same cellulose acetate butyrate and cellulose acetate propionate before grafting as those that used in Examples 23 and 24 were used as comparative samples respectively.

The cellulose acetate butyrate and cellulose acetate propionate were evaluated in the same manner as in Example 1. The results are shown in Table 3.

Note that the cellulose acetate butyrate and cellulose acetate propionate melted when heated. They had thermoplasticity; however, melt viscosity was extremely large. Since it was difficult to mold them, a bending test was not performed.

Comparative Examples 11 and 12

To each of the same cellulose acetate butyrate and cellulose acetate propionate before grafting as those used in Examples 23 and 24 respectively, triethyl citrate (trade name: Citroflex-2 manufactured by Pfizer Inc.) was added as a plasticizer such that the content became 27% by mass based on the whole resin composition. This was mixed by an extruder mixer (HAAKE MiniLab Rheomex extruder (Model CTW5, Thermo Electron Corp., Waltham, Mass.)) at a temperature of 180° C. and a screw rotation speed of 60 rpm to prepare a cellulose acetate butyrate resin composition and a cellulose acetate propionate resin composition.

The resin compositions were evaluated in the same manner as in Example 1. The results are shown in Table 3.

Note that when each of the resin compositions was casted, a phase separation occurred and a uniform film could not be prepared. Thus, a tensile test was not performed.

Comparative Example 13

To compare with Example 26, a resin composition composed of cellulose acetate and triethyl citrate as a plasticizer was prepared in accordance with the same manner as in Comparative Example 2 except that the addition amount of the plasticizer was changed to 63% by mass based on the whole resin composition. The total amount of plasticizer and acetyl group was set to be equal to the amount of cardanol of Example 26. The resin composition was evaluated in the same manner as in Example 1. The results are shown in Table 4.

Note that when the resin composition was casted, a phase separation occurred and a uniform film could not be prepared. Thus, a tensile test was not performed.

Comparative Example 14

An unsaturated bond of cardanol represented by the above Formula (2) (LB-7000: a mixture of 3-pentadecylphenol (about 5%), 3-pentadecylphenol monoene (about 35%), 3-pentadecylphenol diene (about 20%), 3-pentadecylphenol triene (about 40%); manufactured by Tohoku Chemical Industries, Ltd.) was chemically bound to a hydroxy group of a cellulose (trade name: KC Flock W-50G manufactured by Nippon Paper Chemicals) to obtain cardanol-grafted cellulose. More specifically, the cardanol-grafted cellulose was prepared in accordance with the following procedure.

In a dry box, a reaction solvent was prepared from borontrifluoride diethyl ether ($BF_3$—$OEt_2$) (manufactured by Kanto Chemical Co., Inc.) (80 mL) and methylene chloride (100 mL) (manufactured by Kanto Chemical Co., Inc.) under a nitrogen gas atmosphere. To this, cellulose (2 g) was added and the mixture was stirred at room temperature for 2 hours. Thereafter, the cellulose was separated by filtration from the reaction solvent and dried under vacuum. Thereafter, to this, liquid-state cardanol (LB-7000) (100 mL) as mentioned above was added and a grafting reaction was performed while stirring at room temperature for 3 hours. After completion of the reaction, a product was separated by filtration, washed with acetone, extracted by Soxhlet and dried under vacuum at 105° C. for 5 hours to obtain a desired cardanol-grafted cellulose composition (2.5 g). $DS_{CD}$ was obtained from a yield, and $DS_{CD}$ was 0.16.

Note that the composition did not melt even if heated and did not exhibit thermoplasticity. Furthermore, since the composition could be neither molded nor casted, evaluation, such as a bending test and tensile test, was not performed.

Example 27

To the cellulose resin (grafted cellulose acetate)(90 parts by mass) obtained in Example 5, TPU (adipate ester based TPU, trade name: Rezamin P6165 manufactured by Dainichiseika Color & Chemicals Mfg. Co., Ltd.,) (10 parts by mass) was added. The mixture was mixed by an extruder mixer (HAAKE MiniLab Rheomex extruder, Model CTW5, Thermo Electron Corp., Waltham, Mass.) at a temperature of 200° C. and a screw rotation speed of 60 rpm to prepare a cellulose resin composition.

The obtained cellulose resin composition was evaluated in accordance with the following procedure. The results are shown in Table 5. In the table, A-1 represents TPU used in this Example.

Glass transition temperature (heat resistance evaluation) and water absorption rate were obtained by measurement in the same manner as in Example 1.

The obtained cellulose resin composition was molded in the following conditions.
(Molding Conditions)
Temperature: 200° C., Time: 2 minutes, Pressure: 100 kgf ($9.8 \times 10^2$ N),
Size of compact (compact 1): Thickness: 2 mm, Width: 13 mm, Length: 80 mm.
Size of compact (compact 2): Thickness: 4 mm, Width: 10 mm, Length: 80 mm.
[Evaluation of Izod Impact Strength]
Compact 2 obtained by molding in the above was subjected to the measurement of Izod impact strength (provided with a notch) of compact in accordance with JIS K7110.
[Bending Test]
Compact 1 obtained by molding in the above was subjected to a bending test in accordance with JIS K7171.

Example 28

A cellulose resin composition was produced and evaluated in the same manner as in Example 27 except that caprolactone based TPU (trade name: Rezamin P4038S manufactured by Dainichiseika Color & Chemicals Mfg. Co., Ltd.) was used as TPU (represented by A-2 in the table). The results are shown in Table 5.

Example 29

A cellulose resin composition was produced and evaluated in the same manner as Example 27 except that silicone-copolymerized adipate based TPU (trade name: Rezamin PS62470 manufactured by Dainichiseika Color & Chemicals Mfg. Co., Ltd.) was used as TPU (represented by A-3 in the table). The results are shown in Table 5.

Reference Example 1

A cellulose resin composition was produced and evaluated in the same manner as Example 27 except that cyclohexane dicarboxylic acid ester (product name: Hexamoll DINCH, manufactured by BASF Ltd.) serving as a plasticizer was used in place of TPU. The results are shown in Table 5.

Examples 30 to 35

To the cellulose resin (grafted cellulose acetate) obtained in Example 5, a polydimethyl siloxane compound (silicone compound) shown in Table 6 and manufactured by Shin-Etsu Chemical Co., Ltd. was added in accordance with the blending conditions shown in Table 7. This was mixed by an extruder mixer (HAAKE MiniLab Rheomex extruder, Model CTW5, Thermo Electron Corp., Waltham, Mass.) at a temperature of 200° C. and a screw rotation speed of 50 rpm. In this manner, cellulose resin compositions were prepared.

The obtained cellulose resin compositions were evaluated in accordance with the following procedure. The results are show in Table 7.

Glass transition temperature (heat resistance evaluation) and water absorption rate were obtained by measurement in the same manner as in Example 1.

The obtained cellulose resin compositions were molded in the following conditions.
(Molding Conditions)
Temperature: 200° C., Time: 2 minutes, Pressure: 100 kgf ($9.8 \times 10^2$ N),
Size of compact (compact 1): Thickness: 2 mm, Width: 13 mm, Length: 80 mm.

Size of compact (compact 2): Thickness: 4 mm, Width: 10 mm, Length: 80 mm.
[Evaluation of Izod Impact Strength]
Compact 2 obtained by molding in the above was subjected to the measurement of Izod impact strength (provided with a notch) of compact in accordance with JIS K7110.
[Bending Test]
Compact 1 obtained by molding in the above was subjected to a bending test in accordance with JIS K7171.
[Evaluation of Dispersed Particle Diameter]
The obtained resin composition was melted on a hot plate of 200° C. to prepare a preparation, which was observed under an optical microscope (trade name: VHX-500, manufactured by KEYENCE Corporation) at a magnification of 1000× to obtain diameters of dispersed particles of the polysiloxane compound.

Examples 36 to 44

Cellulose resin compositions were prepared and evaluated in the same manner as Examples 30 to 35 except that the cellulose resin of Example 7 was used in place of the cellulose resin of Example 5 and a polysiloxane compound (silicone compound) was added in accordance with the blending conditions shown in Table 8. The results are shown in Table 8.

Reference Example 2

A cellulose resin composition was prepared and evaluated in the same manner as Examples 30 to 35 except that B-11 was used as the polysiloxane compound (silicone compound). The results are shown in Table 7.

Reference Example 3

A cellulose resin composition was prepared and evaluated in the same manner as Examples 36 to 41 except that B-10 was used as the polysiloxane compound (silicone compound). The results are shown in Table 8.

Reference Example 4

A cellulose resin composition was prepared and evaluated in the same manner as Examples 36 to 41 except that B-11 was used as the polysiloxane compound (silicone compound). The results are shown in Table 8.

TABLE 1A

|  |  | Example 1 | Example 2 | Example 3 | Example 4 | Example 5 | Example 6 |
|---|---|---|---|---|---|---|---|
| Amount of acetyl group | $DS_{Ace}$ | 2.1 | 2.1 | 2.1 | 2.1 | 2.1 | 2.1 |
|  | Mass fraction (%) | 16 | 20 | 21 | 21 | 23 | 26 |
| Amount of cardanol derivative | $DS_{CD}$ modified with succinic acid | 0.90 | 0.55 | 0 | 0 | 0 | 0 |
|  | $DS_{CD}$ modified with monochloro acetic acid | 0 | 0 | 0.55 | 0.80 | 0.44 | 0.30 |
|  | Mass fraction (%) | 56 | 46 | 43 | 53 | 38 | 29 |
| Amount of reactive hydrocarbon compound | $DS_{XX}$ | 0 | 0 | 0 | 0 | 0 | 0 |
|  | Mass fraction (%) | 0 | 0 | 0 | 0 | 0 | 0 |
| Addition amount of plasticizer (% by mass) |  | 0 | 0 | 0 | 0 | 0 | 0 |
| Bending strength (MPa) |  | 38 | 48 | 50 | 36 | 60 | 83 |
| Bending elastic modulus (GPa) |  | 0.80 | 1.1 | 1.2 | 0.80 | 1.4 | 1.9 |

TABLE 1A-continued

|  | Example 1 | Example 2 | Example 3 | Example 4 | Example 5 | Example 6 |
|---|---|---|---|---|---|---|
| Bend-breaking strain (%) | >10 | >10 | >10 | >10 | >10 | >10 |
| Tensile strength (MPa) | 29 | 36 | 38 | 27 | 45 | 59 |
| Tensile elastic modulus (GPa) | 0.6 | 0.9 | 1.0 | 0.6 | 1.2 | 1.7 |
| Tensile breaking strain (%) | 57 | 55 | 53 | 57 | 51 | 48 |
| Glass transition temperature (° C.) (heat resistance) | 125 | 134 | 147 | 139 | 142 | 150 |
| Thermoplasticity (press moldability) | ◯ | ◯ | ◯ | ◯ | ◯ | ◯ |
| Water absorption rate (%) | 1.1 | 1.5 | 1.2 | 0.94 | 1.3 | 1.7 |
| Plant component ratio (%) | 71 | 70 | 73 | 76 | 72 | 71 |

TABLE 1B

|  |  | Example 7 | Example 8 | Example 9 | Example 10 | Example 11 | Example 12 | Example 13 | Example 14 | Example 15 | Example 16 |
|---|---|---|---|---|---|---|---|---|---|---|---|
| Amount of acetyl group | $DS_{Ace}$ | 2.1 | 2.1 | 2.1 | 2.1 | 2.1 | 2.1 | 2.1 | 2.1 | 2.1 | 2.1 |
|  | Mass fraction (%) | 25 | 26 | 21 | 24 | 25 | 31 | 24 | 20 | 18 | 20 |
| Amount of cardanol derivative | $DS_{CD}$ modified with succinic acid | 0 | 0 | 0 | 0 | 0 | 0 | 0 | 0 | 0 | 0 |
|  | $DS_{CD}$ modified with monochloro acetic acid | 0.30 | 0.22 | 0.44 | 0.24 | 0.30 | 0.08 | 0.27 | 0.40 | 0.55 | 0.30 |
|  | Mass fraction (%) | 28 | 22 | 36 | 22 | 29 | 9.4 | 25 | 30 | 39 | 23 |
| Amount of reactive hydrocarbon compound | $DS_{XX}$ | xx = BC 0.14 | xx = BC 0.27 | xx = BC 0.22 | xx = BC 0.42 | xx = BC 0.07 | xx = BC 0.16 | xx = BAA 0.15 | xx = BAA 0.40 | xx = BAA 0.28 | xx = BAA 0.52 |
|  | Mass fraction (%) | 4.0 | 8.0 | 5.4 | 12 | 1.8 | 5.7 | 7.3 | 16 | 11 | 21 |
| Addition amount of plasticizer (% by mass) |  | 0 | 0 | 0 | 0 | 0 | 0 | 0 | 0 | 0 | 0 |
| Bending strength (MPa) |  | 113 | 118 | 106 | 112 | 94 | 95 | 106 | 107 | 93 | 95 |
| Bending elastic modulus (GPa) |  | 2.2 | 2.6 | 2.1 | 2.2 | 1.9 | 2.9 | 2.5 | 2.0 | 1.9 | 2.1 |
| Bend-breaking strain (%) |  | >10 | >10 | >10 | >10 | >10 | 6.5 | >10 | >10 | >10 | >10 |
| Tensile strength (MPa) |  | 69 | 72 | 66 | 70 | 64 | 75 | 65 | 65 | 63 | 64 |
| Tensile elastic modulus (GPa) |  | 1.6 | 1.8 | 1.6 | 1.6 | 1.5 | 1.9 | 1.8 | 1.5 | 1.4 | 1.6 |
| Tensile breaking strain (%) |  | 48 | 47 | 52 | 47 | 50 | 30 | 45 | 46 | 48 | 45 |
| Glass transition temperature (° C.) (heat resistance) |  | 154 | 155 | 144 | 156 | 152 | 158 | 148 | 150 | 142 | 147 |
| Thermoplasticity (press moldability) |  | ◯ | ◯ | ◯ | ◯ | ◯ | ◯ | ◯ | ◯ | ◯ | ◯ |
| Water absorption rate (%) |  | 1.3 | 1.6 | 1.1 | 1.2 | 1.4 | 1.9 | 1.0 | 0.72 | 0.68 | 0.65 |
| Plant component ratio (%) |  | 68 | 64 | 68 | 61 | 69 | 62 | 65 | 60 | 66 | 55 |

TABLE 1C

|  |  | Example 17 | Example 18 | Example 19 | Example 20 | Comparative Example 1 | Comparative Example 2 | Comparative Example 3 | Comparative Example 4 | Comparative Example 5 |
|---|---|---|---|---|---|---|---|---|---|---|
| Amount of acetyl group | $DS_{Ace}$ | 2.1 | 2.1 | 2.1 | 2.1 | 2.1 | 2.1 | 2.1 | 2.1 | 2.1 |
|  | Mass fraction (%) | 26 | 27 | 26 | 22 | 36 | 20 | 16 | 24 | 29 |
| Amount of cardanol derivative | $DS_{CD}$ modified with succinic acid | 0 | 0 | 0 | 0 | 0 | 0 | 0 | 0 | 0 |
|  | $DS_{CD}$ modified with monochloro acetic acid | 0.17 | 0.13 | 0.20 | 0.30 | 0 | 0 | 0 | 0 | 0 |
|  | Mass fraction (%) | 17 | 13 | 20 | 25 | 0 | 0 | 0 | 0 | 0 |
| Amount of reactive hydrocarbon compound | $DS_{XX}$ | xx = PPA 0.25 | xx = PPA 0.35 | xx = CHC 0.22 | xx = BCC 0.30 | 0 | 0 | 0 | 0 | xx = PPA 0.47 |
|  | Mass fraction (%) | 9.7 | 14 | 7.1 | 13 | 0 | 0 | 0 | 0 | 20 |
| Addition amount of plasticizer (% by mass) |  | 0 | 0 | 0 | 0 | 0 | 45 | 56 | 34 | 0 |
| Bending strength (MPa) |  | 106 | 108 | 111 | 109 | — | 15 | 11 | 24 | — |
| Bending elastic modulus (GPa) |  | 2.5 | 2.6 | 2.5 | 2.5 | — | 0.41 | 0.29 | 0.72 | — |

TABLE 1C-continued

|  | Example 17 | Example 18 | Example 19 | Example 20 | Comparative Example 1 | Comparative Example 2 | Comparative Example 3 | Comparative Example 4 | Comparative Example 5 |
|---|---|---|---|---|---|---|---|---|---|
| Bend-breaking strain (%) | >10 | >10 | >10 | >10 | — | >10 | >10 | >10 | — |
| Tensile strength (MPa) | 65 | 66 | 68 | 67 | 60 | — | — | — | 52 |
| Tensile elastic modulus (GPa) | 1.4 | 1.4 | 1.6 | 1.5 | 2.3 | — | — | — | 1.9 |
| Tensile breaking strain (%) | 60 | 58 | 55 | 50 | 9.0 | — | — | — | 16 |
| Glass transition temperature (° C.) (heat resistance) | 143 | 142 | 146 | 150 | 227 | 40 | 25 | 71 | 152 |
| Thermoplasticity (press moldability) | ○ | ○ | ○ | ○ | X | ○ | ○ | ○ | X |
| Water absorption rate (%) | 1.9 | 1.8 | 1.8 | 1.4 | 17 | 5.1 | 4.3 | 5.7 | 4.5 |
| Plant component ratio (%) | 61 | 58 | 64 | 65 | 64 | 35 | 28 | 42 | 51 |

TABLE 2

|  |  | Example 21 | Example 22 | Comparative Example 6 | Comparative Example 7 | Comparative Example 8 |
|---|---|---|---|---|---|---|
| Amount of acetyl group | $DS_{Ace}$ | 2.4 | 2.4 | 2.4 | 2.4 | 2.4 |
|  | Mass fraction (%) | 31 | 24 | 31 | 39 | 24 |
| Amount of cardanol derivative | $DS_{CD}$ modified with monochloro acetic acid | 0.19 | 0.50 | 0 | 0 | 0 |
|  | Mass fraction (%) | 20 | 40 | 0 | 0 | 0 |
| Addition amount of plasticizer (% by mass) |  | 0 | 0 | 0 | 20 | 40 |
| Bending strength (MPa) |  | 120 | 59 | — | 50 | 20 |
| Bending elastic modulus (GPa) |  | 2.8 | 1.5 | — | 2.3 | 0.80 |
| Bend-breaking strain (%) |  | >10 | >10 | — | >10 | >10 |
| Tensile strength (MPa) |  | 55 | 38 | 58 | — | — |
| Tensile elastic modulus (GPa) |  | 1.8 | 1.0 | 2.1 | — | — |
| Tensile breaking strain (%) |  | 34 | 53 | 11 | — | — |
| Glass transition temperature (° C.) (heat resistance) |  | 154 | 134 | 216 | 90 | 63 |
| Thermoplasticity (press moldability) |  | ○ | ○ | X | ○ | ○ |
| Water absorption rate (%) |  | 2.1 | 1.2 | 9.0 | 3.1 | 2.6 |
| Plant component ratio (%) |  | 66 | 71 | 61 | 49 | 36 |

TABLE 3

|  |  | Example 23 | Example 24 | Example 25 | Comparative Example 9 | Comparative Example 10 | Comparative Example 11 | Comparative Example 12 |
|---|---|---|---|---|---|---|---|---|
| Amount of acetyl group | $DS_{Ace}$ | 1.0 | 0.18 | 0.18 | 1.0 | 0.18 | 1.0 | 0.18 |
|  | Mass fraction (%) | 9.8 | 1.8 | 2.0 | 13 | 2.5 | 9.8 | 1.8 |
| Amount of butyryl/ propionyl group | $DS_{Bu}$ or $DS_{Pr}$ | $DS_{Bu}$ 1.66 | $DS_{Pr}$ 2.49 | $DS_{Pr}$ 2.49 | $DS_{Bu}$ 1.66 | $DS_{Pr}$ 2.49 | $DS_{Bu}$ 1.66 | $DS_{Pr}$ 2.49 |
|  | Mass fraction (%) | 27 | 27 | 36 | 37 | 46 | 27 | 34 |
| Amount of cardanol derivative | $DS_{CD}$ modified with monochloro acetic acid | 0.34 | 0.33 | 0.21 | 0 | 0 | 0 | 0 |
|  | Mass fraction (%) | 27 | 27 | 19 | 0 | 0 | 0 | 0 |
| Amount of reactive hydrocarbon compound | $DS_{XX}$ | 0 | 0 | xx = BC 0.10 | 0 | 0 | 0 | 0 |
|  | Mass fraction (%) | 0 | 0 | 2.7 | 0 | 0 | 0 | 0 |
| Addition amount of plasticizer (% by mass) |  | 0 | 0 | 0 | 0 | 0 | 27 | 27 |
| Bending strength (MPa) |  | 45 | 49 | 60 | — | — | 23 | 15 |
| Bending elastic modulus (GPa) |  | 1.3 | 1.4 | 1.6 | — | — | 0.79 | 0.82 |
| Bend-breaking strain (%) |  | >10 | >10 | >10 | — | — | >10 | >10 |
| Tensile strength (MPa) |  | 35 | 39 | 43 | 36 | 40 | — | — |
| Tensile elastic modulus (GPa) |  | 0.85 | 0.87 | 1.0 | 1.0 | 1.1 | — | — |
| Tensile breaking strain (%) |  | 100 | 98 | 82 | 55 | 52 | — | — |
| Glass transition temperature (° C.) (heat resistance) |  | 94 | 92 | 100 | 135 | 143 | 59 | 59 |
| Thermoplasticity (press moldability) |  | ○ | ○ | ○ | Δ | Δ | ○ | ○ |
| Water absorption rate (%) |  | 0.65 | 0.76 | 0.74 | 2.6 | 3.1 | 1.5 | 1.6 |
| Plant component ratio (%) |  | 60 | 61 | 57 | 50 | 52 | 36 | 38 |

TABLE 4

|  |  | Example 26 | Comparative Example 13 |
|---|---|---|---|
| Amount of cellulose | Mass fraction (%) | 24 | 24 |
| Amount of acetyl group | $DS_{Ace}$ | 0 | 2.1 |
|  | Mass fraction (%) | 0 | 13 |
| Amount of cardanol derivative | $DS_{CD}$ modified with monochloro acetic acid | 1.49 | 0 |
|  | Mass fraction (%) | 76 | 0 |
| Addition amount of plasticizer (% by mass) |  | 0 | 63 |
| Bending strength (MPa) |  | 25 | 9 |
| Bending elastic modulus (GPa) |  | 0.38 | 0.20 |

TABLE 4-continued

|  | Example 26 | Comparative Example 13 |
|---|---|---|
| Bend-breaking strain (%) | >10 | >10 |
| Tensile strength (MPa) | 17 | — |
| Tensile elastic modulus (GPa) | 0.26 | — |
| Tensile breaking strain (%) | 22 | — |
| Glass transition temperature (° C.) (heat resistance) | 84 | 21 |
| Thermoplasticity (press moldability) | ○ | ○ |
| Water absorption rate (%) | 1.9 | 4.0 |
| Plant component ratio (%) | 89 | 24 |

TABLE 5

|  | Example 27 | Example 28 | Example 29 | Example 5 | Reference Example 1 |
|---|---|---|---|---|---|
| Amount of cellulose resin (% by mass) | 90 | 90 | 90 | 100 | 90 |
| TPU | A-1 | A-2 | A-3 | — | — |
| (% by mass) | 10 | 10 | 10 |  |  |
| Plasticizer (% by mass) | — | — | — | — | 10 |
| Impact strength (kJ/m$^2$) | 8.5 | 8.4 | 12.6 | 6.7 | 7.3 |
| Bending strength (MPa) | 57 | 58 | 55 | 60 | 50 |
| Bending elastic modulus (GPa) | 1.3 | 1.3 | 1.3 | 1.4 | 1.1 |
| Bend-breaking strain (%) | >10 | >10 | >10 | >10 | >10 |
| Glass transition temperature (° C.) (heat resistance) | 141 | 140 | 140 | 142 | 135 |
| Water absorption rate (%) | 1.3 | 1.3 | 1.2 | 1.3 | 1.3 |

TABLE 6

| No. | Product name | Substituent 1 Average content (%) | Substituent 2 Average content (%) | Viscosity (mm$^2$/s) | Average molecular weight |
|---|---|---|---|---|---|
| B-1 | KF8002 | Side-chain amino group 0.94 | — | 1100 | 24000 |
| B-2 | KF8005 | Side-chain amino group 0.15 | — | 1200 | 25000 |
| B-3 | X22-173DX | Epoxy group at an end 0.96 | — | 65 | 4500 |
| B-4 | KF101 | Side-chain epoxy group 12.3 | — | 1500 | 27000 |
| B-5 | KF1001 | Side-chain epoxy group 1.23 | — | 17000 | 67000 |
| B-6 | X22-4039 | Side-chain carbinol group 1.76 | — | 90 | 6000 |
| B-7 | KF50-3000cs | Side-chain phenyl group 9.6 | — | 3000 | 36000 |
| B-8 | X22-2000 | Side-chain phenyl group 9.6 | Side-chain epoxy group 6.94 | 190 | 8000 |
| B-9 | X22-3000T | Side-chain aralkyl group 7.5 | Side-chain epoxy group 17.2 | 2500 | 32000 |
| B-10 | X22-715 | Fatty acid ester group 73 | — | 14000 | — |
| B-11 | KF96-1000cs | — | — | 1000 | 23000 |

TABLE 7

|  | Example 30 | Example 31 | Example 32 | Example 33 | Example 34 | Example 35 | Example 5 | Reference Example 2 |
|---|---|---|---|---|---|---|---|---|
| Amount of cellulose resin (% by mass) | 97 | 97 | 97 | 97 | 97 | 97 | 100 | 97 |
| Silicone compound | B-1 | B-2 | B-3 | B-5 | B-7 | B-8 | — | B-11 |
| (% by mass) | 3 | 3 | 3 | 3 | 3 | 3 | — | 3 |
| Diameter of dispersed particle (μm) | 0.5-1 | 3-6 | 8-12 | 6-10 | 5-8 | 0.5-1 | — | 10-20 |
| Impact strength (kJ/m$^2$) | 8.4 | 8.2 | 10.9 | 9.9 | 10.1 | 7.5 | 6.7 | 5.6 |
| Bending strength (MPa) | 61 | 62 | 63 | 62 | 60 | 60 | 60 | 60 |
| Bending elastic modulus (GPa) | 1.4 | 1.4 | 1.3 | 1.5 | 1.5 | 1.4 | 1.4 | 1.5 |
| Bend-breaking strain (%) | >10 | >10 | >10 | >10 | >10 | >10 | >10 | >10 |
| Glass transition temperature (° C.) (heat resistance) | 143 | 144 | 145 | 141 | 143 | 142 | 142 | 134 |
| Water absorption rate (%) | 1.2 | 1.2 | 1.2 | 1.2 | 1.3 | 1.3 | 1.3 | 1.3 |

TABLE 8

|  | Example 36 | Example 37 | Example 38 | Example 39 | Example 40 | Example 41 | Example 42 | Example 43 | Example 44 | Example 7 | Reference Example 3 | Reference Example 4 |
|---|---|---|---|---|---|---|---|---|---|---|---|---|
| Amount of cellulose resin (% by mass) | 97 | 97 | 97 | 97 | 97 | 97 | 97 | 97 | 97 | 100 | 97 | 97 |
| Silicone compound 1 | B-2 | B-4 | B-5 | B-6 | B-7 | B-9 | B-5 | B-5 | B-3 | — | B-10 | B-11 |
| (% by mass) | 3 | 3 | 3 | 3 | 3 | 3 | 2.1 | 1.5 | 2.1 | — | 3 | 3 |
| Silicone compound 2 | — | — | — | — | — | — | B-9 | B-9 | B-10 | — | — | — |
| (% by mass) |  |  |  |  |  |  | 0.9 | 0.5 | 0.9 |  |  |  |
| Diameter of dispersed particle (μm) | 5-8 | 0.5-1 | 6-10 | 5-8 | 5-8 | 0.1-1 | 3-6 | 3-6 | 3-6 | — | <0.1 | 10-20 |
| Impact strength (kJ/m$^2$) | 6.2 | 6.5 | 5.3 | 6.6 | 7.0 | 5.7 | 7.5 | 7.4 | 7.3 | 4.4 | 4.2 | 4.0 |
| Bending strength (MPa) | 114 | 115 | 114 | 113 | 113 | 115 | 114 | 113 | 113 | 113 | 112 | 113 |
| Bending elastic modulus (GPa) | 2.4 | 2.5 | 2.4 | 2.3 | 2.2 | 2.3 | 2.3 | 2.2 | 2.4 | 2.2 | 2.2 | 2.3 |
| Bend-breaking strain (%) | >10 | >10 | >10 | >10 | >10 | >10 | >10 | >10 | >10 | >10 | >10 | >10 |
| Glass transition temperature (° C.) (heat resistance) | 155 | 154 | 157 | 150 | 153 | 154 | 154 | 153 | 153 | 154 | 150 | 152 |
| Water absorption rate (%) | 1.3 | 1.3 | 1.3 | 1.4 | 1.4 | 1.3 | 1.4 | 1.4 | 1.3 | 1.3 | 1.3 | 1.4 |

When Examples 1 to 6 are compared to Comparative Example 1, the cardanol-grafted cellulose resins (an acetyl group is also added to a cellulose hydroxy group) of the examples each had thermoplasticity (press moldability) and excellent bending properties without reducing a plant component ratio, and further tensile properties (particularly, breaking strain) and water resistance (water absorption rate) were improved, compared to the cellulose derivative (cellulose acetate) before grafting which had no thermoplasticity. Furthermore, when Examples 1 to 6 are compared to Comparative Examples 2 to 4, the cardanol-grafted cellulose resins (an acetyl group is also added to a cellulose hydroxy group) of the examples were more improved in bending properties, tensile properties and water resistance than the cellulose derivatives before grafting (cellulose acetate) which contained the plasticizer. In addition, high heat resistance (glass transition temperature) was obtained without reducing the plant component ratio.

As shown in Examples 7 to 20, bending properties (particularly, bending strength) and tensile properties (particularly, tensile strength) can be even more improved while obtaining high water resistance by grafting with not only cardanol but also a reactive hydrocarbon.

In Examples 21 and 22 and Comparative Examples 6 to 8, compared to Examples 1 to 20 and Comparative Examples 1 to 5, the amount of acetyl group added to a cellulose hydroxy group is increased. Even in these case, when Examples 21 and 22 are compared to Comparative Example 6, the cardanol-grafted cellulose resins of the examples each had thermoplasticity and excellent bending properties without reducing a plant component ratio, and further tensile properties (particularly, breaking strain) and water resistance were improved, compared to the cellulose derivative before grafting which had no thermoplasticity. Furthermore, when Examples 21 and 22 are compared to Comparative Examples 7 and 8, the cardanol-grafted cellulose resins of the examples were more improved in bending properties (particularly, bending strength), tensile properties and water resistance than the cellulose derivatives before grafting which contained the plasticizer. In addition, high heat resistance was obtained without reducing the plant component ratio.

As shown in Comparative Examples 2 to 4, 7 and 8 containing plasticizer, excellent heat resistance was not obtained by adding the plasticizer alone. According to the exemplary embodiment, not only thermoplasticity can be imparted to a cellulose resin but also excellent heat resistance can be obtained.

Furthermore, as shown in Comparative Example 5 in which a reactive hydrocarbon alone was grafted, thermoplasticity was not obtained only by grafting a reactive hydrocarbon alone, and bending properties, tensile properties (particularly, breaking strain) and water resistance were not improved. According to the exemplary embodiment, not only thermoplasticity can be imparted to a cellulose resin but also excellent bending properties, tensile properties (particularly, breaking strain) and water resistance can be obtained.

Examples 23 to 25 and Comparative Examples 9 to 12, each are an example of a cellulose resin prepared by using a cellulose derivative having not only an acetyl group but also a butyryl group or a propionyl group added to a hydroxy group. Even in these case, when Examples 23 to 25 are compared to Comparative Examples 9 and 10, in the cardanol-grafted cellulose resins of the examples, excellent thermoplasticity and bending properties were obtained without reducing the plant component ratio, and further tensile properties (particularly breaking strain) and water resistance were improved, compared to the cellulose derivatives before grafting. Furthermore, when Examples 23 to 25 and Comparative Examples 11 and 12 are compared, the cardanol-grafted cellulose resins of the examples were more improved in bending properties (particularly, bending strength), tensile properties and water resistance than the cellulose derivatives before grafting which contained the plasticizer. In addition, high heat resistance was obtained without reducing the plant component ratio.

Example 26 is an example of a cellulose resin prepared by using cellulose having a cellulose hydroxy group to which an acyl group such as an acetyl group is not added. Even in this case, when Example 26 is compared to Comparative Example 13, the cardanol-grafted cellulose resin of the example was more improved in bending properties (particularly, bending strength), tensile properties and water resistance than the cellulose derivative of Comparative Example 13, in which the cellulose derivative (cellulose acetate) contained a plasticizer (the weight ratio of the cellulose component is the same as the example 26). In addition, high heat resistance was obtained without reducing the plant component ratio.

As described above, according to the examples, it is possible to provide a cellulose resin improved in water resistance and having good thermoplasticity (press moldability) and sufficient heat resistance while maintaining a high plant component ratio (high vegetism). Furthermore, a press compact having high bending properties can be obtained and a film compact can be improved in tensile properties (particularly, toughness). Furthermore, according to the examples, a grafted cellulose resin having a high plant component ratio as well as high utilization ratio of non-edible parts can be obtained.

In Table 5, when Examples 27 to 29 containing a thermoplastic polyurethane elastomer (TPU) are compared to Example 5 containing no TPU, it was found that the obtained cellulose resin compositions in which TPU was added to a cellulose resin were excellent in shock resistance while maintaining satisfactory strength, heat resistance (Tg) and water resistance. In particular, as shown in Example 29, it was found that a resin composition having even more excellent shock resistance than any other resin compositions to which general TPU was added, can be obtained by adding TPU copolymerized with silicon.

Furthermore, the resin compositions of Examples 27 to 29, in which TPU was added thereto, exhibited the equal or larger meltability in the same molding conditions, and exhibited good thermoplasticity, compared to the cardanol-added cellulose resin of Example 5, which contained no TPU. Note that, in the cardanol-added cellulose resin of Reference Example 1, in which a plasticizer was added thereto, the effect of improving shock resistance was not obtained, and strength and heat resistance decreased.

When Examples 30 to 35 are compared to Example 5 in Table 7, and Examples 36 to 44 are compared to Example 7 in Table 8, it was found that a resin composition in which a modified polydimethyl siloxane compound was added to a cellulose resin was excellent in shock resistance while maintaining satisfactory strength, heat resistance (Tg) and water resistance. In particular, as shown in Examples 42 to 44, it was found that a resin composition having even more excellent shock resistance can be obtained by adding two types of modified polydimethyl siloxane compounds in combination.

Furthermore, the resin compositions of Examples 30 to 44, in which a modified polydimethyl siloxane compound was added thereto, exhibited equal or larger meltability, compared to the cardanol-added cellulose resins of Examples 5 and 7 in the same molding conditions, and exhibited good thermoplasticity.

On the other hand, in Reference Example 2 and Reference Example 4, in which polydimethyl siloxane (B-11) having no organic substituent was added thereto, an effect of improving shock resistance was not obtained. Furthermore, also in Reference Example 3, in which a modified polydimethyl siloxane (B-10) having an average content of the organic substituent exceeding 70% by mass was singly added, an effect of improving shock resistance was not obtained.

Having thus described the present invention with reference to the exemplary embodiments, the present invention is not limited to the above-described exemplary embodiments. Various modifications understandable to those skilled in the art may be made to the constitution and details of the present invention within the scope thereof.

The invention claimed is:

1. A method for producing a cellulose resin, comprising:
reacting a multifunctional compound comprising a first functional group capable of reacting with a hydroxy group of cellulose and a second functional group capable of reacting with a phenolic hydroxy group of cardanol, with cardanol to form a cardanol derivative, by reacting the second functional group with the phenolic hydroxy group; and
reacting the first functional group derived from the multifunctional compound of the cardanol derivative with a hydroxy group of cellulose or a derivative thereof to bind the cardanol derivative to the cellulose or a derivative thereof,
wherein a cellulose carbon atom to which the cellulose hydroxy group is bound and a cardanol carbon atom to which the phenolic hydroxy group is bound are linked via an organic linking group,
the organic linking group comprises:
 a first bond binding to the cellulose carbon atom wherein the first bond is one of an ester bond, an ether bond and a urethane bond, and
 a second bond binding to the cardanol carbon atom wherein the second bond is one of an ester bond, an ether bond, and a urethane bond,
 wherein when the first bond is an ester bond or a urethane bond, then the second bond is an ester bond, an ether bond, or a urethane bond, and
 wherein when the first bond is an ether bond, then the second bond is an ester bond or a urethane bond; and
 at least one acyl group selected from a group consisting of an acetyl group, a propionyl group and a butyryl group is added to a cellulose hydroxy group of the cellulose or a derivative thereof.

2. The method for producing a cellulose resin according to claim 1, wherein the multifunctional compound comprises a hydrocarbon group having 1 to 20 carbon atoms.

3. The method for producing a cellulose resin according to claim 1, wherein the multifunctional compound comprises a functional group selected from the group consisting of a carboxyl group, a carboxylic halide group, a carboxylic acid anhydride group, an epoxy group, an isocyanate group and a halogen group.

4. The method for producing a cellulose resin according to claim 1, wherein the multifunctional compound comprises a functional group selected from the group consisting of a carboxyl group, a carboxylic acid anhydride group and a halogen group.

5. The method for producing a cellulose resin according to claim 1, wherein the multifunctional compound is a compound comprising a carboxylic acid anhydride group, or a compound comprising a carboxyl group and a halogen group.

6. The method for producing a cellulose resin according to claim 1, wherein:
the multifunctional compound comprises a carboxyl group or a carboxylic acid anhydride group, and
the process further comprises converting a carboxyl group of the cardanol derivative into a carboxylic halide group, after forming the cardanol derivative.

7. The method for producing a cellulose resin according to claim 1, further comprising hydrogenating an unsaturated bond of the cardanol or a derivative thereof.

8. The method for producing a cellulose resin according to claim 1, wherein a reactive hydrocarbon compound comprising a functional group capable of reacting with the cellulose hydroxy group is reacted with the cellulose or a derivative thereof, simultaneously or separately with the cardanol derivative, to bind the reactive hydrocarbon compound to the cellulose or a derivative thereof.

9. The method for producing a cellulose resin according to claim 8, wherein the reactive hydrocarbon compound is a hydrocarbon compound comprising a carboxyl group, a carboxylic halide group or a carboxylic acid anhydride group.

10. The method for producing a cellulose resin according to claim 8, wherein the reactive hydrocarbon compound is at least one monocarboxylic acid, an acid halide thereof or acid anhydride thereof, the monocarboxylic acid being selected from an aliphatic carboxylic acid, an aromatic carboxylic acid and an alicyclic carboxylic acid.

11. The method according to claim 1, wherein the first bond is an ester bond and the second bond is an ester bond or an ether bond.

12. The method according to claim 1, wherein the organic linking group comprises a divalent hydrocarbon group having 1 to 20 carbon atoms.

13. The method according to claim 12, wherein:
the cellulose carbon atom and the hydrocarbon group are bound via an ester bond as the first bond, and
the cardanol carbon atom and the hydrocarbon group are bound via an ester bond or an ether bond as the second bond.

14. The method according to claim 1, wherein a number of the cardanol molecules or a derivative thereof added to the cellulose or a derivative thereof per glucose unit, the number being abbreviated as $DS_{CD}$, is 0.1 or more.

15. The method according to claim 1, wherein a number of the acyl groups added to a cellulose hydroxy group of the cellulose or a derivative thereof per glucose unit, the number being abbreviated as $DS_{AC}$, is 0.5 or more.

16. The method according to claim 1, wherein a number of the acyl groups added to a cellulose hydroxy group of the cellulose or a derivative thereof per glucose unit, the number being abbreviated as $DS_{AC}$, is 0.5 or more and 2.7 or less.

17. The method according to claim 1, wherein a number of remaining cellulose hydroxy groups per glucose unit, the number being abbreviated as $DS_{OH}$, is 0.9 or less.

18. The method according to claim 1, wherein a sum of the cellulose component and the cardanol component is 50% by mass or more, based on the total amount of the resin.

* * * * *